US010933697B2

(12) United States Patent
Kuriyama et al.

(10) Patent No.: US 10,933,697 B2
(45) Date of Patent: Mar. 2, 2021

(54) PNEUMATIC TIRE

(71) Applicant: The Yokohama Rubber Co., LTD., Tokyo (JP)

(72) Inventors: Masatoshi Kuriyama, Hiratsuka (JP); Noboru Kuwahara, Hiratsuka (JP)

(73) Assignee: The Yokohama Rubber Co., LTD.

( * ) Notice: Subject to any disclaimer, the term of this patent is extended or adjusted under 35 U.S.C. 154(b) by 324 days.

(21) Appl. No.: 15/747,741

(22) PCT Filed: Jul. 8, 2016

(86) PCT No.: PCT/JP2016/070318
§ 371 (c)(1),
(2) Date: Jan. 25, 2018

(87) PCT Pub. No.: WO2017/018174
PCT Pub. Date: Feb. 2, 2017

(65) Prior Publication Data
US 2018/0215206 A1 Aug. 2, 2018

(30) Foreign Application Priority Data
Jul. 27, 2015 (JP) .............................. JP2015-147931

(51) Int. Cl.
*B60C 11/12* (2006.01)
*B60C 11/04* (2006.01)
*B60C 11/01* (2006.01)
*B60C 11/13* (2006.01)
*B60C 11/03* (2006.01)

(52) U.S. Cl.
CPC .............. *B60C 11/04* (2013.01); *B60C 11/01* (2013.01); *B60C 11/032* (2013.01);
(Continued)

(58) Field of Classification Search
CPC ... B60C 11/125; B60C 11/0304; B60C 11/03; B60C 11/12; B60C 11/13;
(Continued)

(56) References Cited

U.S. PATENT DOCUMENTS 5,814,169 A * 9/1998 Yamaguchi ............. B60C 11/11
152/209.22
5,924,464 A * 7/1999 White ................. B60C 11/0306
152/209.17
(Continued)

FOREIGN PATENT DOCUMENTS

DE 102011050705 A1 * 12/2012 ........... B60C 11/045
EP 0855292 B1 * 11/2002 ......... B60C 11/1263
(Continued)

OTHER PUBLICATIONS

International Search Report for International Application No. PCT/JP2016/070318 dated Oct. 18, 2016, 4 pages, Japan.

*Primary Examiner* — Steven D Maki
*Assistant Examiner* — Cedrick S Williams
(74) *Attorney, Agent, or Firm* — Thorpe North & Western

(57) ABSTRACT

A pneumatic tire comprises a tread surface comprising main grooves extending in a tire circumferential direction, at least two of the main grooves adjacent in the tire circumferential direction having a wave shape with periodic oscillation; adjacent land portions in a tire lateral direction formed by the main grooves; lug grooves disposed in a row in the tire circumferential direction in the land portion formed between the wave-shaped main grooves, the lug grooves intersecting the tire circumferential direction and communicating with the wave-shaped main grooves at both ends; and narrow grooves disposed between pairs of the lug grooves adjacent in the tire circumferential direction in a row in the tire circumferential direction, the narrow grooves intersecting the tire circumferential direction, communicating with one of the main grooves at a first end, terminating within the land portion at a second end, and having a narrower groove width than the lug grooves.

12 Claims, 8 Drawing Sheets

(52) U.S. Cl.
CPC ...... *B60C 11/0304* (2013.01); *B60C 11/0306* (2013.01); *B60C 11/12* (2013.01); *B60C 11/1204* (2013.01); *B60C 11/125* (2013.01); *B60C 11/1236* (2013.01); *B60C 11/13* (2013.01); *B60C 11/1392* (2013.01); *B60C 2011/013* (2013.01); *B60C 2011/0346* (2013.01); *B60C 2011/0348* (2013.01); *B60C 2011/0353* (2013.01); *B60C 2011/0355* (2013.01); *B60C 2011/0358* (2013.01); *B60C 2011/0365* (2013.01); *B60C 2011/0367* (2013.01); *B60C 2011/0381* (2013.01); *B60C 2011/1209* (2013.01); *B60C 2011/1213* (2013.01); *B60C 2011/1295* (2013.01); *B60C 2011/1361* (2013.01)

(58) Field of Classification Search
CPC ..... B60C 2011/0311; B60C 2011/0381; B60C 2011/0346; B60C 2011/1213
See application file for complete search history.

(56) References Cited

U.S. PATENT DOCUMENTS

| | | | | |
|---|---|---|---|---|
| 7,597,127 B2 * | 10/2009 | Mathews | ................ | B60C 11/11 152/209.18 |
| 2005/0247388 A1 | 11/2005 | Ohsawa et al. | | |
| 2010/0096053 A1 * | 4/2010 | Nagai | ................ | B60C 11/0306 152/209.9 |
| 2010/0314012 A1 * | 12/2010 | Hada | ................ | B60C 11/0309 152/209.16 |
| 2012/0211135 A1 * | 8/2012 | Kojima | ................ | B60C 11/01 152/209.16 |
| 2012/0247632 A1 | 10/2012 | Hayahii | | |
| 2014/0305563 A1 * | 10/2014 | Kujime | ............... | B60C 11/1236 152/209.18 |
| 2015/0151588 A1 | 6/2015 | Munezawa | | |
| 2016/0368326 A1 * | 12/2016 | Wakizono | ........... | B60C 11/0304 |

FOREIGN PATENT DOCUMENTS

| | | |
|---|---|---|
| JP | S61-175104 | 8/1986 |
| JP | H10-211805 | 8/1998 |
| JP | 2004-090769 | 3/2004 |
| JP | 2010-089720 | 4/2010 |
| JP | 2012066797 A * | 4/2012 |
| JP | 2012-201335 | 10/2012 |
| JP | 2013-193464 | 9/2013 |
| JP | 2014-076764 | 5/2014 |
| WO | WO 2004/024471 | 3/2004 |
| WO | WO 2013/137193 | 9/2013 |

* cited by examiner

| | | CONVENTIONAL EXAMPLE | EXAMPLE 1 | EXAMPLE 2 | EXAMPLE 3 | EXAMPLE 4 | EXAMPLE 5 |
|---|---|---|---|---|---|---|---|
| MAIN GROOVE SHAPE | | WAVE-LIKE SHAPE WITH OSCILLATION (VARIED GROOVE WIDTH) | WAVE-LIKE SHAPE WITH OSCILLATION (VARIED GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) |
| CENTRAL LAND PORTION | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | TWO: COMMUNICATES WITH MAIN GROOVE AT BOTH ENDS | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION |
| MIDDLE LAND PORTION ON VEHICLE OUTER SIDE | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | TWO: COMMUNICATES WITH MAIN GROOVE AT BOTH ENDS | TWO: COMMUNICATES WITH MAIN GROOVE AT BOTH ENDS | TWO: COMMUNICATES WITH MAIN GROOVE AT BOTH ENDS | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION |
| MIDDLE LAND PORTION ON VEHICLE OUTER SIDE | AUXILIARY GROOVE | NO | NO | NO | NO | YES | YES |
| | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH AUXILIARY GROOVE AND MAIN GROOVE AT BOTH ENDS | TERMINATES WITHIN LAND PORTION AT ONE END PORTION |
| | NARROW GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS |
| | COMMUNICATION NARROW GROOVE | NO | NO | NO | NO | NO | YES |
| | LUG NARROW GROOVE | NO | NO | NO | NO | NO | NO |
| SHOULDER LAND PORTION ON VEHICLE OUTER SIDE | LUG GROOVE | COMMUNICATES WITH MAIN GROOVE | COMMUNICATES WITH MAIN GROOVE | COMMUNICATES WITH MAIN GROOVE | COMMUNICATES WITH MAIN GROOVE | COMMUNICATES WITH MAIN GROOVE | COMMUNICATES WITH MAIN GROOVE |
| | NARROW GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE |
| | COMMUNICATION NARROW GROOVE | NO | NO | NO | NO | NO | NO |
| | LUG NARROW GROOVE | NO | NO | NO | NO | NO | NO |
| | RECESSED PORTION | NO | NO | NO | NO | NO | NO |
| SHOULDER LAND PORTION ON VEHICLE INNER SIDE | LUG GROOVE | COMMUNICATES WITH MAIN GROOVE | COMMUNICATES WITH MAIN GROOVE | COMMUNICATES WITH MAIN GROOVE | COMMUNICATES WITH MAIN GROOVE | COMMUNICATES WITH MAIN GROOVE | COMMUNICATES WITH MAIN GROOVE |
| | NARROW GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE | ONE: NOT COMMUNICATING WITH MAIN GROOVE |
| | COMMUNICATION NARROW GROOVE | NO | NO | NO | NO | NO | NO |
| | LUG NARROW GROOVE | NO | NO | NO | NO | NO | NO |
| | RECESSED PORTION | NO | NO | NO | NO | NO | NO |
| WEAR RESISTANCE PERFORMANCE | | 100 | 102 | 102 | 104 | 106 | 107 |
| BRAKING PERFORMANCE ON WET ROAD SURFACES | | 100 | 100 | 102 | 102 | 102 | 102 |

FIG. 9

|  |  | EXAMPLE 6 | EXAMPLE 7 | EXAMPLE 8 | EXAMPLE 9 | EXAMPLE 10 | EXAMPLE 11 | EXAMPLE 12 |
| --- | --- | --- | --- | --- | --- | --- | --- | --- |
| MAIN GROOVE SHAPE | | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION: BULGE GROOVE (CONSTANT GROOVE WIDTH) | WAVE-LIKE SHAPE WITH OSCILLATION: BULGE GROOVE (CONSTANT GROOVE WIDTH) |
| CENTER LAND PORTION | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION |
| MIDDLE LAND PORTION ON VEHICLE OUTER SIDE | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION | TWO: TERMINATES WITHIN LAND PORTION AT ONE END PORTION |
| MIDDLE LAND PORTION ON VEHICLE INNER SIDE | AUXILIARY GROOVE | YES | YES | YES | YES | YES | YES | YES |
| | LUG GROOVE | TERMINATES WITHIN LAND PORTION AT ONE END PORTION | TERMINATES WITHIN LAND PORTION AT ONE END PORTION | TERMINATES WITHIN LAND PORTION AT ONE END PORTION | TERMINATES WITHIN LAND PORTION AT ONE END PORTION | TERMINATES WITHIN LAND PORTION AT ONE END PORTION | TERMINATES WITHIN LAND PORTION AT ONE END PORTION | TERMINATES WITHIN LAND PORTION AT ONE END PORTION |
| | NARROW GROOVE | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS | COMMUNICATES WITH AUXILIARY GROOVE AND MAIN GROOVE AT BOTH ENDS |
| | COMMUNICATION NARROW GROOVE | YES | YES | YES | YES | YES | YES | YES |
| | LUG NARROW GROOVE | YES | YES | YES | YES | YES | YES | YES |
| SHOULDER LAND PORTION ON VEHICLE OUTER SIDE | LUG GROOVE | COMMUNICATES WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE |
| | NARROW GROOVE | ONE: NOT COMMUNICATING WITH MAIN GROOVE | ONE: COMMUNICATING WITH MAIN GROOVE | TWO: COMMUNICATING WITH MAIN GROOVE | TWO: COMMUNICATING WITH MAIN GROOVE | TWO: COMMUNICATING WITH MAIN GROOVE | TWO: COMMUNICATING WITH MAIN GROOVE | TWO: COMMUNICATING WITH MAIN GROOVE |
| | COMMUNICATION NARROW GROOVE | NO | NO | NO | YES | YES | YES | YES |
| | LUG NARROW GROOVE | NO | NO | NO | NO | YES | YES | YES |
| | RECESSED PORTION | NO | NO | NO | NO | NO | NO | YES NARROW GROOVE TERMINATING END |
| SHOULDER LAND PORTION ON VEHICLE INNER SIDE | LUG GROOVE | COMMUNICATES WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE |
| | NARROW GROOVE | ONE: NOT COMMUNICATING WITH MAIN GROOVE | ONE: COMMUNICATES WITH MAIN GROOVE | ONE: COMMUNICATES WITH MAIN GROOVE | ONE: COMMUNICATES WITH MAIN GROOVE | ONE: COMMUNICATES WITH MAIN GROOVE | ONE: COMMUNICATES WITH MAIN GROOVE | ONE: COMMUNICATES WITH MAIN GROOVE |
| | COMMUNICATION NARROW GROOVE | NO | NO | NO | YES | YES | YES | YES |
| | LUG NARROW GROOVE | NO | NO | NO | NO | YES | YES | YES |
| | RECESSED PORTION | NO | NO | NO | NO | NO | NO | YES NARROW GROOVE TERMINATING END |
| WEAR RESISTANCE PERFORMANCE | | 107 | 108 | 107 | 106 | 105 | 107 | 107 |
| BRAKING PERFORMANCE ON WET ROAD SURFACES | | 103 | 102 | 103 | 104 | 105 | 105 | 106 |

FIG. 10

PNEUMATIC TIRE

TECHNICAL FIELD

The present technology relates to a pneumatic tire that can provide enhanced wear resistance performance while maintaining braking performance on wet road surfaces.

BACKGROUND ART

The conventional pneumatic tire described in Japanese Unexamined Patent Application Publication No. 2014-076764, for example, is designed to improve both wet performance (braking performance on wet road surfaces) and noise performance (anti-external noise performance). This pneumatic tire includes a plurality of wave-shaped circumferential grooves extending in the tire circumferential direction with left and right groove walls having a wave-like shape with a wavelength and an amplitude, and at least one row of wave-shaped land portions defined by adjacent wave-shaped circumferential grooves. The shape of the left and right groove walls of the wave-shaped circumferential grooves have identical wavelengths but with a phase difference. The groove wall on the wave-shaped land portion side of one of the left and right wave-shaped circumferential grooves that define the row of wave-shaped land portions has an amplitude that is greater than that of the groove wall on the wave-shaped land portion side of the other wave-shaped circumferential groove.

The conventional heavy duty pneumatic tire described in Japanese Unexamined Patent Application Publication No. 61-175104, for example, is designed to improve both wet performance (braking performance on wet road surfaces) and uneven wear resistance performance. This heavy duty pneumatic tire includes a tread that includes at least three main grooves extending in the tire circumferential direction in a zigzag manner that define the tread in the tire lateral direction, shoulder ribs located at least on the outermost sides in the tire lateral direction on the tread, and second ribs inwardly adjacent to the shoulder ribs that divide the main grooves. The ridge lines of the shoulder ribs and the second ribs that face the main grooves located outward in the tire lateral direction have a smaller zigzag pitch and amplitude.

In the pneumatic tire of Japanese Unexamined Patent Application Publication No. 2014-076764 described above, the wave-like shape of the left and right groove walls of the wave-shaped circumferential grooves provide improved braking performance on wet road surfaces. However, improving the rigidity of the land portions to enhance wear resistance performance may decrease the braking performance on wet road surfaces. In the heavy duty pneumatic tire of Japanese Unexamined Patent Application Publication No. 61-175104 described above, the ridge lines of the shoulder ribs and the second ribs that face the main grooves located outward in the tire lateral direction have a smaller zigzag pitch and amplitude. The resulting difference in rigidity may adversely affect wear resistance performance. Additionally, the corner portions formed by the zigzag shape of the main grooves may experience uneven wear.

SUMMARY

The present technology provides a pneumatic tire that can provide enhanced wear resistance performance while maintaining braking performance on wet road surfaces.

A pneumatic tire according to an embodiment of the present technology comprises:

a plurality of main grooves extending in a tire circumferential direction, at least two of the plurality of main grooves adjacent in the tire circumferential direction having a wave-like shape with periodic oscillation;

a plurality of land portions adjacent to one another in a tire lateral direction formed by the plurality of main grooves;

a plurality of lug grooves disposed in a row in the tire circumferential direction in the land portion formed between the wave-shaped main grooves, the plurality of lug grooves each intersecting the tire circumferential direction and communicating with the wave-shaped main grooves at both ends; and a plurality of narrow grooves disposed between pairs of the plurality of lug grooves adjacent in the tire circumferential direction in a row in the tire circumferential direction, the plurality of narrow grooves each intersecting the tire circumferential direction, communicating with one of the main grooves at a first end, terminating within the land portion at a second end, and having a narrower groove width than the plurality of lug grooves.

According to the pneumatic tire, two main grooves adjacent in the tire lateral direction have a wave-like shape with periodic oscillation. This increases the overall width of the main grooves and provides good drainage properties, and allows braking performance on wet road surfaces to be maintained. Furthermore, according to the pneumatic tire, the lug grooves are disposed in a row in the tire circumferential direction and communicate with the wave-like main grooves at both ends. This allows good drainage properties to be provided, and braking performance on wet road surfaces to be maintained. Additionally, according to the pneumatic tire, by the narrow grooves being disposed between pairs of the lug grooves adjacent in the tire circumferential direction, good drainage properties can be provided, the braking performance on wet road surfaces can be maintained, and by the narrow grooves communicating with the main groove at the first end and terminating within the land portion at the second end and having a narrower groove width than the lug grooves, a decrease in the rigidity of the land portions between the wave-like main grooves can be suppressed and wear resistance performance can be improved.

A pneumatic tire according to an embodiment of the present technology may have a configuration wherein, the plurality of main grooves in the tread surface comprises four main grooves, each having periodic oscillation;

a center land portion, middle land portions adjacent to the center land portion on either side in the tire lateral direction, and shoulder land portions outwardly adjacent to the middle land portions in the tire lateral direction are formed by the plurality of main grooves; and the center land portion and a first middle land portion of the middle land portions comprise the plurality of lug grooves and the plurality of narrow grooves.

According to the pneumatic tire, the center land portion and one of the adjacent middle land portions on either side of the center land portion in the tire lateral direction have good drainage properties. This allows braking performance on wet road surfaces to be maintained. Also, by suppressing a decrease in rigidity of the center land portion and one of the adjacent middle land portions on either side of the center land portion, the obtained effect of improving wear resistance performance can be significant.

A pneumatic tire according to an embodiment of the present technology may have a configuration wherein, a second middle land portion of the middle land portions comprises an auxiliary groove that extends in a linear manner in the tire circumferential direction and has a narrower groove width than the plurality of main grooves; and a plurality of middle land portion narrow grooves disposed in a row in the tire circumferential direction, the plurality of middle land portion narrow grooves each intersecting the tire circumferential direction, communicating with the main groove located outward in the tire lateral direction and the auxiliary groove at both end portions, and having a narrower groove width than the plurality of lug grooves.

According to the pneumatic tire, the second middle land portion greatly contributes to drainage properties, and so by the second middle land portion being provided with the auxiliary groove extending in a linear manner in the tire circumferential direction and the middle land portion narrow grooves, good drainage properties can be provided, and thus the braking performance on wet road surfaces can be improved. Furthermore, the auxiliary groove has a narrower groove width than the main grooves, and the middle land portion narrow grooves have a narrower groove width than the lug grooves. Thus, a decrease in the rigidity of the middle land portion can be suppressed, and wear resistance performance can be improved.

A pneumatic tire according to an embodiment of the present technology may have a configuration wherein, the second middle land portion comprises a plurality of middle land portion lug grooves disposed in a row in the tire circumferential direction, the plurality of middle land portion lug grooves each intersecting the tire circumferential direction, communicating with the main groove located inward in the tire lateral direction at a first end, and terminating within the second middle land portion at a second end without reaching the auxiliary groove; and a plurality of communication narrow grooves connecting terminating ends of the plurality of middle land portion lug grooves to the auxiliary groove and having a narrower groove width than the plurality of middle land portion lug grooves.

According to the pneumatic tire, in the other middle land portion, the other middle land portion is provided with the middle land portion lug grooves that communicate with the main groove located inward in the tire lateral direction at the first end and terminate within the other middle land portion at the second end without reaching the auxiliary groove and the communication narrow grooves that connect the terminating ends of the middle land portion lug groove and the auxiliary grooves. This provides good drainage properties and allows braking performance on wet road surfaces to be further maintained. Furthermore, the middle land portion lug grooves that terminate within the middle land portion are provided and the communication narrow grooves have a narrower groove width than the middle land portion lug grooves. This allows a decrease in the rigidity of the middle land portions to be suppressed and wear resistance performance to be improved.

A pneumatic tire according to an embodiment of the present technology may have a configuration further comprising, a plurality of lug narrow grooves in which a lug groove and a narrow groove are present disposed between the plurality of middle land portion lug grooves and the plurality of communication narrow grooves.

According to the pneumatic tire, the lug narrow grooves are disposed between the middle land portion lug grooves and the communication narrow grooves. This allows excessive changes in rigidity at the communicating portion between the middle land portion lug grooves and the communication narrow grooves to be suppressed, and wear resistance performance to be improved.

A pneumatic tire according to an embodiment of the present technology may have a configuration wherein, the shoulder land portions comprise a plurality of shoulder land portion lug grooves disposed in a row in the tire circumferential direction, the plurality of shoulder land portion lug grooves each intersecting the tire circumferential direction and terminating without reaching the main groove located inward of the shoulder land portion in the tire lateral direction; and a shoulder land portion narrow groove disposed between pairs of the plurality of shoulder land portion lug grooves adjacent in the tire circumferential direction, the shoulder land portion narrow groove intersecting the tire circumferential direction, communicating with the main groove located inward of the shoulder land portion in the tire lateral direction at an end portion, and having a narrower groove width than the plurality of shoulder land portion lug grooves.

According to the pneumatic tire, the shoulder land portion lug grooves provide good drainage properties in the shoulder land portions, and the terminating ends within the shoulder land portion allow a decrease in rigidity of the shoulder land portion to be suppressed and wear resistance performance to be improved. Furthermore, according to the pneumatic tire, the shoulder land portion narrow grooves provide good drainage properties and allow braking performance on wet road surfaces to be improved. Additionally, the shoulder land portion narrow grooves have a narrower groove width than the shoulder land portion lug grooves. This allows a decrease in rigidity of the shoulder land portions to be suppressed and wear resistance performance to be improved.

A pneumatic tire according to an embodiment of the present technology may have a configuration wherein, in a first shoulder land portion of the shoulder land portions, a plurality of the shoulder land portion narrow grooves are disposed in a row in the tire circumferential direction between pairs of the shoulder land portion lug grooves adjacent in the tire circumferential direction.

According to the pneumatic tire, the shoulder land portion narrow grooves disposed in a row in the tire circumferential direction provide good drainage properties and allow braking performance on wet road surfaces to be improved.

A pneumatic tire according to an embodiment of the present technology may have a configuration further comprising, a plurality of communication narrow grooves connecting terminating ends of the plurality of shoulder land portion lug grooves and the main groove located inward of the shoulder land portion in the tire lateral direction and having a narrower groove width than the plurality of shoulder land portion lug grooves.

According to the pneumatic tire, the communication narrow grooves that connect the terminating ends of the shoulder land portion lug grooves and the main groove provide good drainage properties and allow braking performance on wet road surfaces to be further maintained. Furthermore, the shoulder land portion lug grooves that terminate within the shoulder land portions are provided and the communication narrow grooves have a narrower groove width than the shoulder land portion lug grooves. This allows a decrease in the rigidity of the shoulder land portions to be suppressed and wear resistance performance to be improved.

A pneumatic tire according to an embodiment of the present technology may have a configuration further comprising, a plurality of lug narrow grooves in which a lug groove and a narrow groove are present disposed between the plurality of shoulder land portion lug grooves and the plurality of communication narrow grooves.

According to the pneumatic tire, the lug narrow grooves are disposed between the shoulder land portion lug grooves and the communication narrow grooves. This allows excessive changes in rigidity at the communicating portion between the shoulder land portion lug grooves and the communication narrow grooves to be suppressed, and wear resistance performance to be improved.

A pneumatic tire according to an embodiment of the present technology may have a configuration wherein, the main groove located inward of a second shoulder land portion of the shoulder land portions in the tire lateral direction comprises a plurality of bulge grooves at positions corresponding to the plurality of communication narrow grooves that bulge toward the adjacent second middle land portion.

According to the pneumatic tire, the bulge grooves are provided bulging toward the adjacent second middle land portion at positions corresponding to the communication narrow grooves. This allows the bulge grooves to function as a catchment for discharging water to the communication narrow grooves, and allows braking performance on wet road surfaces to be further maintained.

A pneumatic tire according to an embodiment of the present technology may have a configuration wherein, the shoulder land portions comprise a plurality of recessed portions formed at an outer end in the tire lateral direction; and the plurality of shoulder land portion narrow grooves terminate at the plurality of recessed portions at an outer end portion in the tire lateral direction.

According to the pneumatic tire, the outer end portions of the shoulder land portion narrow grooves in the tire lateral direction terminate at the recessed portions. This prevents loads acting on the outer end portions of the shoulder land portion narrow grooves in the tire lateral direction, and allows a decrease in rigidity of the shoulder land portions to be suppressed and wear resistance performance to be improved.

A pneumatic tire according to an embodiment of the present technology can provide enhanced wear resistance performance while maintaining braking performance on wet road surfaces.

BRIEF DESCRIPTION OF DRAWINGS

FIG. 9 is a table showing the results of performance tests of pneumatic tires according to Examples of the present technology.

FIG. 10 is a table showing the results of performance tests on pneumatic tires according to Examples of the present technology.

DETAILED DESCRIPTION

Embodiments of the present technology are described in detail below based on the drawings. However, the present technology is not limited to these embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
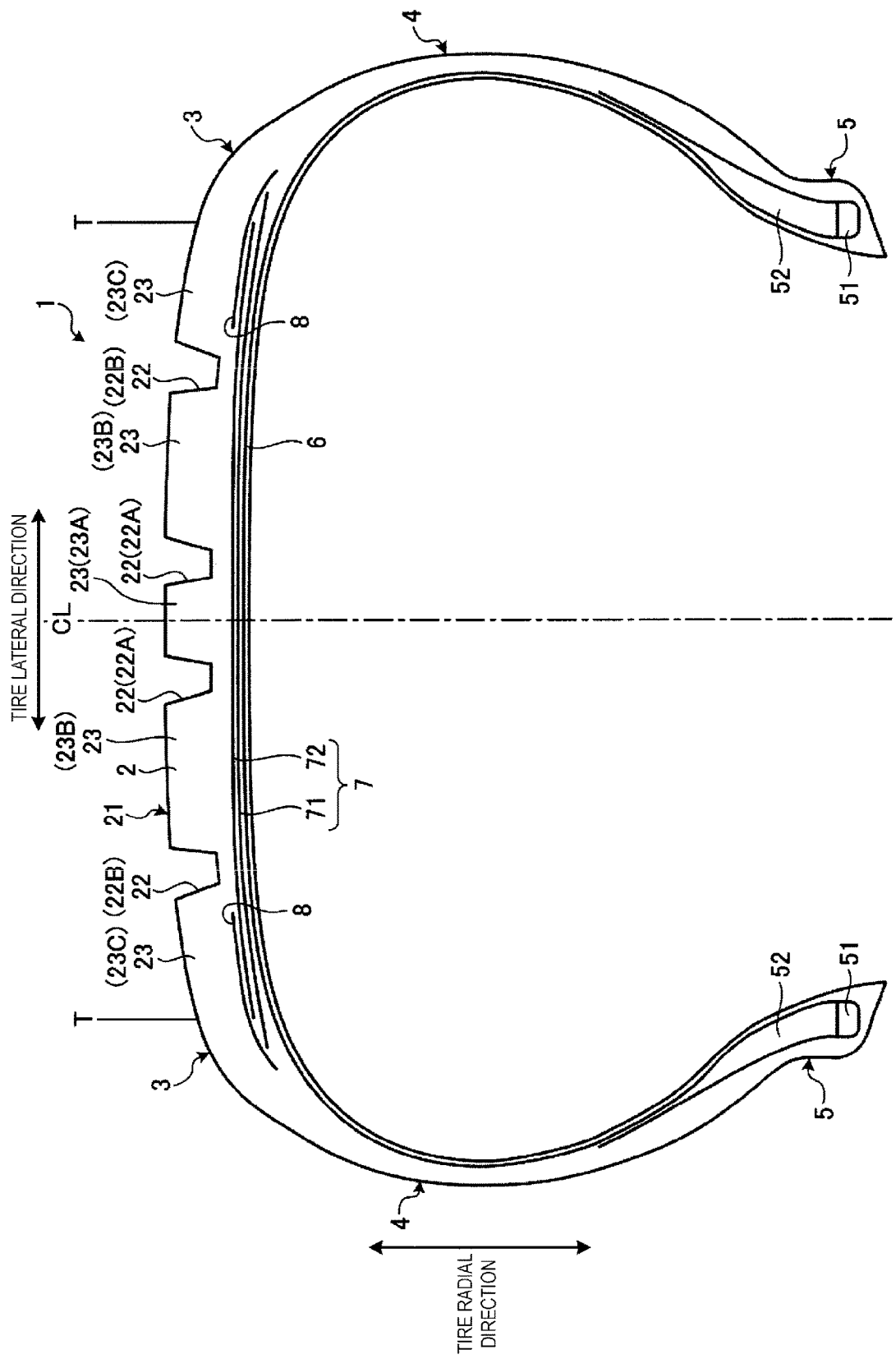
FIG. 1 is a meridian cross-sectional view of a pneumatic tire according to an embodiment of the present technology.
Figure 2:
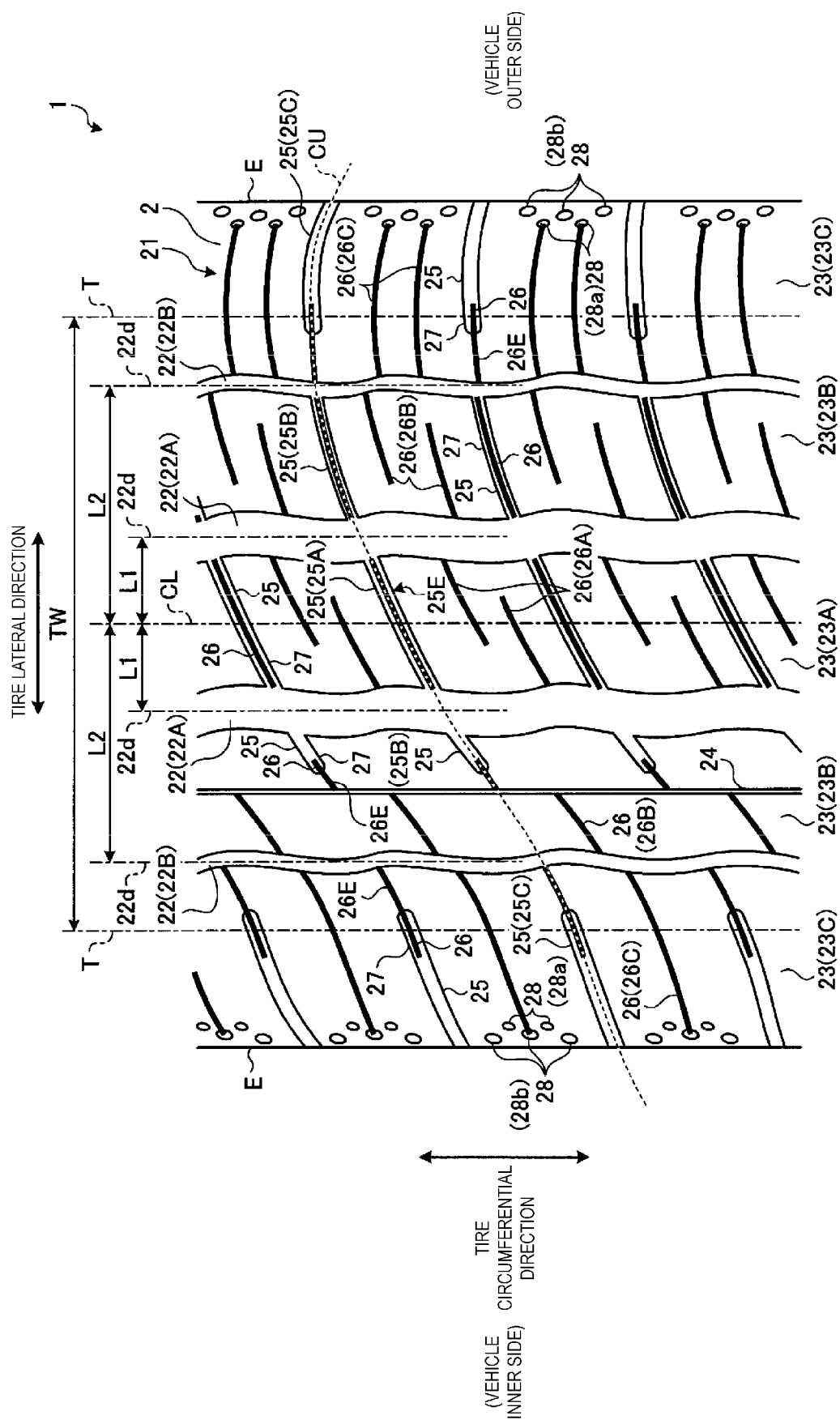
FIG. 2 is a plan view of a tread portion of a pneumatic tire according to an embodiment of the present technology.
Figure 3:
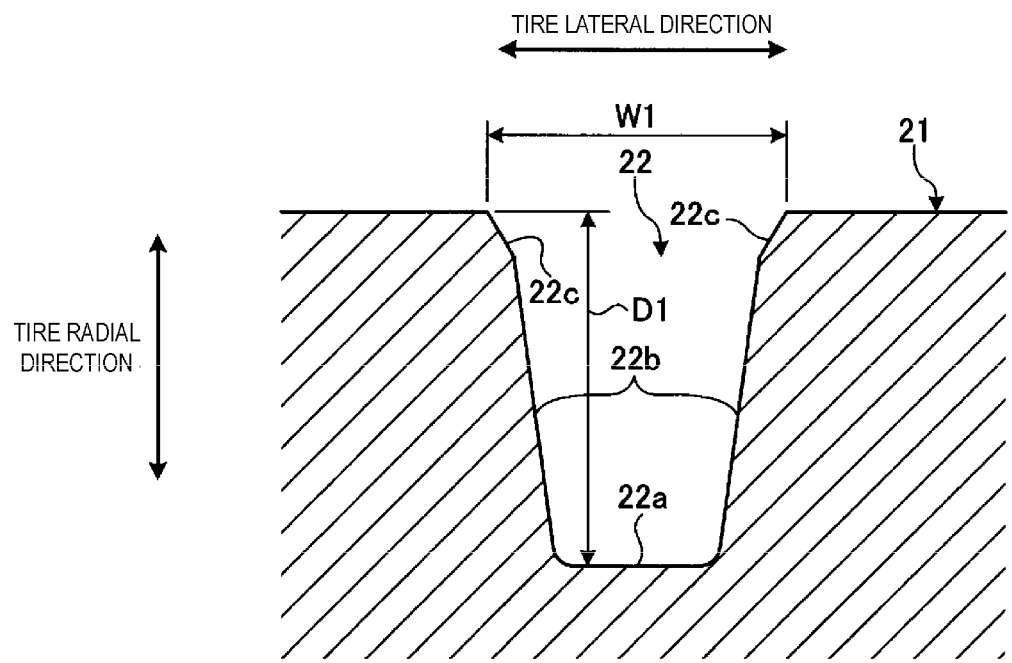
FIG. 3 is an enlarged cross-sectional view of a main groove of a pneumatic tire according to an embodiment of the present technology.
Figure 4:
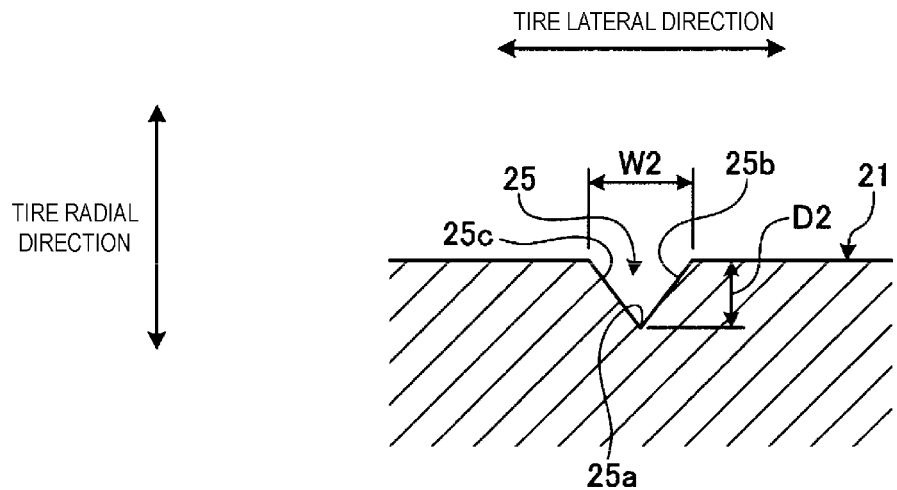
FIG. 4 is an enlarged cross-sectional view of a lug groove of a pneumatic tire according to an embodiment of the present technology.
Figure 5:
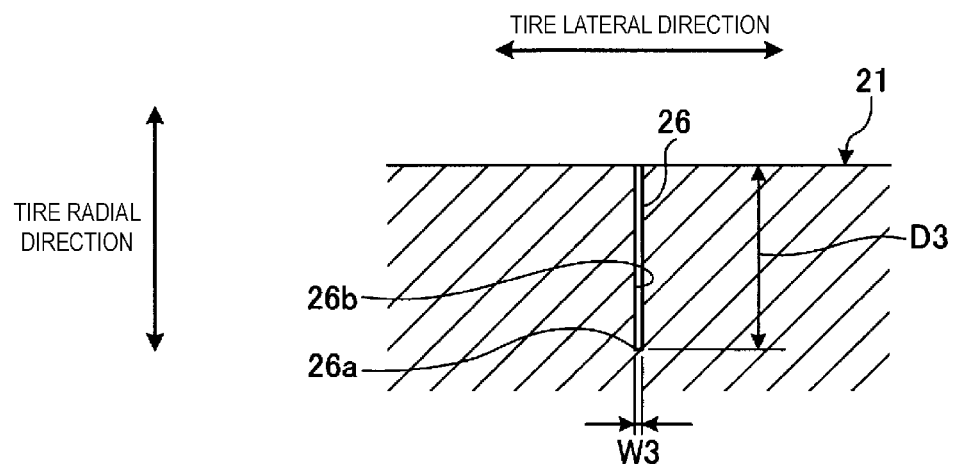
FIG. 5 is an enlarged cross-sectional view of a narrow groove of a pneumatic tire according to an embodiment of the present technology.
Figure 6:
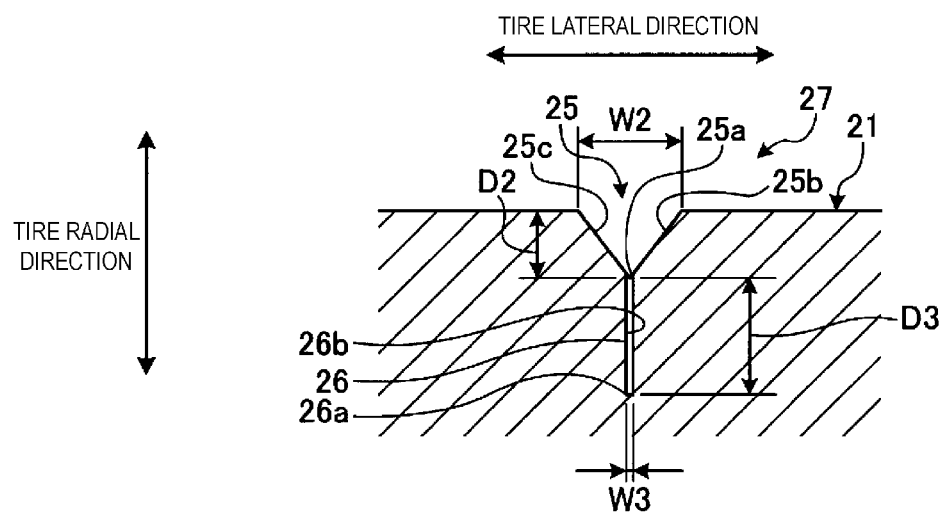
FIG. 6 is an enlarged cross-sectional view of a lug narrow groove of a pneumatic tire according to an embodiment of the present technology.

FIG. 1 is a meridian cross-sectional view of a pneumatic tire according to the present embodiment. FIG. 2 is a plan view of a tread portion of the pneumatic tire according to the present embodiment. FIG. 3 is an enlarged cross-sectional view of a main groove of the pneumatic tire according to the present embodiment. FIG. 4 is an enlarged cross-sectional view of a lug groove of the pneumatic tire according to the present embodiment. FIG. 5 is an enlarged cross-sectional view of a narrow groove of the pneumatic tire according to the present embodiment. FIG. 6 is an enlarged cross-sectional view of a lug narrow groove of the pneumatic tire according to the present embodiment.

Herein, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. "Tire circumferential direction" refers to the circumferential direction with the rotation axis as the center axis. "Tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. "Tire equatorial plane CL" refers to the plane orthogonal to the rotation axis of the pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line along the tire circumferential direction of the pneumatic tire 1 that lies on the tire equatorial plane CL. In the present embodiment, the tire equator line and the tire equatorial plane are both denoted by reference sign CL.

As illustrated in FIG. 1, the pneumatic tire 1 is mainly used on passenger vehicles and includes a tread portion 2, shoulder portions 3 on opposite sides of the tread portion 2, and sidewall portions 4 and bead portions 5 continuing in that order from the shoulder portions 3. The pneumatic tire 1 also includes a carcass layer 6, a belt layer 7, and a belt reinforcing layer 8.

The tread portion 2 is made of rubber material (tread rubber), is exposed on the outermost side of the pneumatic tire 1 in the tire radial direction, and the surface thereof constitutes the contour of the pneumatic tire 1. The outer circumferential surface of the tread portion 2 is a tread surface 21 that mainly comes into contact with a road surface when the tire runs.

The shoulder portions 3 are portions located outward in the tire lateral direction on both sides of the tread portion 2. Additionally, the sidewall portions 4 are exposed on the outermost sides of the pneumatic tire 1 in the tire lateral direction. The bead portions 5 each include a bead core 51 and a bead filler 52. The bead core 51 is formed by a bead wire, which is a steel wire, wound into an annular shape. The bead filler 52 is a rubber material that is disposed in the space formed by an end of the carcass layer 6 in the tire lateral direction folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is constituted by a plurality of coating-rubber-covered carcass cords (not illustrated) disposed in alignment at an angle with respect to the tire circumferential direction that conforms with the tire meridian direction. The carcass cords are made of organic fibers (for example, polyester, rayon, and nylon). At least one carcass layer 6 is provided.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71 and 72 each include a plurality of coating-rubber-covered cords (not illustrated) disposed in alignment at a predetermined angle with respect to the tire circumferential direction (for example, from 20° to 30°. The cords are made of steel or organic fibers (for example, polyester, rayon, and nylon). Moreover, the belts 71 and 72 overlap each other and are disposed so that the direction of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 includes a plurality of coating-rubber-covered cords (not illustrated) disposed in alignment in the tire lateral direction substantially parallel)(±5°) with the tire circumferential direction. The cords are made of steel or organic fibers (for example, polyester, rayon, and nylon). The belt reinforcing layer 8 illustrated in FIG. 1 is disposed so as to cover end portions in the tire lateral direction of the belt layer 7. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire belt layer 7, and the outer reinforcing layer in the tire radial direction is disposed so as to only cover the end portions of the belt layer 7 in the tire lateral direction. In another example, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portions of the belt layer 7 in the tire lateral direction. Additionally, the belt reinforcing layer 8 is constituted of a band-like strip material (having, for example, a width of 10 mm) wound in the tire circumferential direction.

For the pneumatic tire 1 according to the present embodiment, the vehicle inner/outer side orientation when the pneumatic tire 1 is mounted to a vehicle is designated. In other words, when the pneumatic tire 1 is mounted on a vehicle, the orientation with respect to the inner side and the outer side of the vehicle in the tire lateral direction is designated. While the designated orientation is not illustrated in the drawings, the orientation is indicated, for example, by an indicator provided on the sidewall portion 4. For the pneumatic tire 1, the side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases where the tire 1 is mounted on a vehicle. For example, rims have an orientation with respect to the inner side and outer side of the vehicle in the tire lateral direction. Thus, when the pneumatic tire 1 is mounted on a rim, the orientation with respect to the vehicle inner side and the vehicle outer side in the tire lateral direction is designated.

As illustrated in FIGS. 1 and 2, in the pneumatic tire 1 as described above, four main grooves 22 extending in the tire circumferential direction are formed in the tread surface 21 of the tread portion 2.

The main grooves 22 include two center main grooves 22A disposed adjacent to the center in the tire lateral direction on either side of the tire equatorial plane CL and shoulder main grooves 22B disposed outward of the center main grooves 22A in the tire lateral direction. Additionally, five land portions 23 are formed by the main grooves 22 in the tread surface 21. The land portions 23 include a center land portion 23A disposed between the center main grooves 22A and on the tire equatorial plane CL; middle land portions 23B disposed between the center main grooves 22A and the shoulder main grooves 22B and outwardly adjacent to the center land portion 23A in the tire lateral direction; and shoulder land portions 23C disposed outward of the shoulder main grooves 22B in the tire lateral direction, outwardly adjacent to the middle land portions 23B in the tire lateral direction, and outermost in the tread portion 2 in the tire lateral direction.

The main grooves 22 (22A, 22B) have a wave-like shape with periodic oscillation and a constant groove width W1 in the tire circumferential direction. The wave-like shape of the main grooves 22 can be such that a groove bottom 22a illustrated in FIG. 3 has a linear shape in the tire circumferential direction and groove walls 22b have periodic oscillation such that the groove width W1 is constant in the tire circumferential direction. Alternatively, the wave-like shape of the main grooves 22 can be such that the groove bottom 22a and the groove walls 22b illustrated in FIG. 3 have periodic oscillation such that the groove width W1 is constant in the tire circumferential direction. In the present embodiment, as illustrated in FIG. 3, the main grooves 22 are formed with a chamfer 22c on the opening edges. The groove width W1 of the main grooves 22 is the opening width to the tread surface 21. Thus, the groove width W1 of the main grooves 22 with the chamfer 22c is the groove width W1 between the outer edges of the chamfers 22c. As illustrated in FIG. 3, the center main grooves 22A of the main grooves 22 has a groove width W1 ranging from 5 mm to 12 mm and a groove depth D1 ranging from 4 mm to 8 mm. The shoulder main grooves 22B have a groove width W1 ranging from 3 mm to 6 mm and a groove depth D1 ranging from 4 mm to 8 mm. The groove width W1 of the center main grooves 22A is greater than that of the shoulder main grooves 22B. For example, the groove width W1 of the shoulder main grooves 22B ranges from 10% to 50% of the groove width W1 of the center main grooves 22A. This is preferable to maintain the drainage properties of the center main grooves 22A and to ensure the rigidity of the land portions 23 around the shoulder main grooves 22B. Additionally, as illustrated in FIG. 2, the center main grooves 22A of the main grooves 22 have a central line 22d of oscillation located a distance L1 outward from the tire equatorial plane CL in the tire lateral direction, the distance L1 being a distance ranging from 20% to 30% of a ground contact width TW. The shoulder main grooves 22B have a central line 22d of oscillation located a distance L2 outward from the tire equatorial plane CL in the tire lateral direction, the distance L2 being a distance ranging from 60% to 70% of the ground contact width TW. This is preferable to maintain the drainage properties of the center main grooves 22A and to ensure the rigidity of the land portions 23 around the shoulder main grooves 22B. The edge shape and dimensions of the land portions 23 in the tire lateral direction can be determined depending on the oscillation and position in the tire lateral direction of the main grooves 22.

Herein, "ground contact width TW" refers to the width of the ground contact region in the tire lateral direction. Additionally, the outermost edges of the ground contact region in the tire lateral direction are referred to as ground contact edges T. FIG. 2 illustrates the ground contact edges T as being continuous in the tire circumferential direction. The ground contact region is the region where the tread surface 21 of the tread portion 2 of the pneumatic tire 1 comes into contact with a dry, flat road surface, when the pneumatic tire 1 is mounted on a regular rim, inflated to the regular internal pressure, and loaded with 70% of the regular load. "Regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

In the pneumatic tire 1 according to the present embodiment, the middle land portion 23B on the vehicle inner side is provided with an auxiliary groove 24 extending in a linear manner in the tire circumferential direction. The auxiliary groove 24 has a smaller groove width than the main groove 22 with the smallest groove width W1. The auxiliary groove 24 is centrally disposed between the center main groove 22A and the shoulder main groove 22B that form the middle land portion 23B on the vehicle inner side. The auxiliary groove 24 divides the middle land portion 23B on the vehicle inner side into rib land portions adjacent in the tire lateral direction. The auxiliary groove 24 has a groove width ranging from 1 mm to less than 3 mm and a groove depth ranging from 4 mm to 8 mm.

In the pneumatic tire 1 according to the present embodiment, the land portions 23 are provided with lug grooves 25 and narrow grooves 26 that intersect the tire circumferential direction. The lug grooves 25 provided in the center land portion 23A are referred to as center land portion lug grooves 25A, the lug grooves 25 provided in the middle land portions 23B are referred to as middle land portion lug grooves 25B, and the lug grooves 25 provided in the shoulder land portions 23C are referred to as shoulder land portion lug grooves 25C. The narrow grooves 26 provided in the center land portion 23A are referred to as center land portion narrow grooves 26A, the narrow grooves 26 provided in the middle land portions 23B are referred to as middle land portion narrow grooves 26B, and the narrow grooves 26 provided in the shoulder land portions 23C are referred to as shoulder land portion narrow grooves 26C. The narrow grooves 26 that communicate with a terminating end of one of the lug grooves 25 and connect to one of the main grooves 22 or the auxiliary grooves 24 are referred to as communication narrow grooves 26E. Additionally, in the pneumatic tire 1 according to the present embodiment, a lug narrow groove 27 is provided where both the lug groove 25 and the narrow groove 26 are present and connected.

As illustrated in FIG. 4, the lug groove 25 includes groove walls 25b formed with a chamfer 25c from the opening portion in the tread surface 21 to a groove bottom 25a. The lug groove 25 has a groove width W2 ranging from 2 mm to 4 mm and a groove depth D2 less than that of the main grooves 22 and the auxiliary groove 24 ranging from 2 mm to 6 mm. As illustrated in FIG. 5, the narrow groove 26 includes groove walls 26b formed from the opening portion in the tread surface 21 to a groove bottom 26a in the tire radial direction. The narrow groove 26 has a groove width W3 ranging from 0.4 mm to 1.0 mm and a groove depth D3 less than that of the main grooves 22 and the auxiliary groove 24 ranging from 3 mm to 6 mm. As illustrated in FIG. 6, the lug narrow groove 27 includes the lug groove 25 and the narrow groove 26 formed in the groove bottom 25a of the lug groove 25 in the extension direction of the lug groove 25. The sum of the groove depth D2 of the lug groove 25 and the groove depth D3 of the narrow groove 26 makes an overall groove depth of 6 mm or less, less than that of the main grooves 22 and the auxiliary groove 24. Additionally, the groove depth D3 of the narrow groove 26 of the lug narrow groove 27 is preferably 70% or greater of the overall groove depth (D2+D3) of the lug narrow groove 27 including the lug groove 25.

The center land portion lug grooves 25A provided in the center land portion 23A are disposed in the tire circumferential direction. The center land portion lug grooves 25A communicate at both ends with the center main grooves 22A that form the center land portion 23A and divide the center land portion 23A into a plurality of blocks disposed in a row in the tire circumferential direction. Note that in the present embodiment, the center land portion lug grooves 25A are composed overall of the lug narrow grooves 27 where both the lug grooves 25 and the narrow grooves 26 are present.

The middle land portion lug grooves 25B provided in the middle land portion 23B on the vehicle outer side are disposed in the tire circumferential direction. The middle land portion lug grooves 25B communicate at both ends with the center main groove 22A and the shoulder main groove 22B that form the middle land portion 23B on the vehicle outer side and divide the middle land portion 23B on the vehicle outer side into a plurality of blocks disposed in a row in the tire circumferential direction. Additionally, the middle land portion lug grooves 25B provided in the middle land portion 23B on the vehicle outer side communicate at one end with the shoulder main groove 22B that forms the middle land portion 23B on the vehicle outer side and terminates there. Note that in the present embodiment, the middle land portion lug grooves 25B provided in the middle land portion 23B on the vehicle outer side are composed overall of the lug narrow grooves 27 where both the lug grooves 25 and the narrow grooves 26 are present.

The middle land portion lug grooves 25B provided in the middle land portion 23B on the vehicle inner side communicate at a first end with the center main groove 22A that forms the middle land portions 23B on the vehicle inner side and terminates at a second end within the middle land portion 23B on the vehicle inner side without reaching the auxiliary groove 24. Accordingly, the middle land portion 23B on the vehicle inner side is formed as a rib-like land portion. Note that in the present embodiment, the middle land portion lug grooves 25B provided in the middle land portion 23B on the vehicle inner side are, at the terminating end portion, lug narrow grooves 27 where both the lug grooves 25 and the narrow grooves 26 are present. The communication narrow groove 26E extends from the narrow groove 26 of the lug narrow groove 27 and communicates with the auxiliary groove 24.

The middle land portion lug grooves 25B provided in the middle land portion 23B on the vehicle outer side and the center land portion lug grooves 25A provided in the center land portion 23A are provided such that in a plan view they are one groove that passes through the center main groove 22A on the vehicle outer side, with both ends at the center main groove 22A between the middle land portion 23B on the vehicle outer side and the center land portion 23A facing one another. The center land portion lug grooves 25A provided in the center land portion 23A and the middle land portion lug grooves 25B provided in the middle land portion 23B on the vehicle inner side are provided such that in a plan view they are one groove that passes through the center main groove 22A on the vehicle inner side, with both ends at the center main groove 22A between the center land portion 23A and the middle land portion 23B on the vehicle inner side facing one another. Thus, the middle land portion lug groove 25B provided in the middle land portion 23B on the vehicle outer side, the center land portion lug groove 25A provided in the center land portion 23A, and the middle land portion lug groove 25B provided in the middle land portion 23B on the vehicle inner side constitute one through lug grooves 25 that passes through the center main grooves 22A. In other words, a plurality of the through lug grooves 25E are provided in the tire circumferential direction. The through lug grooves 25E intersect the tire circumferential direction and pass through the center land portion 23A and the middle land portion 23B on the vehicle outer side. Also, the through lug grooves 25E open to the shoulder main groove 22B on the vehicle outer side at a first end at the middle land portion 23B on the vehicle outer side and pass through the center main groove 22A on the vehicle inner side of the center land portion 23A and terminate within the middle land portion 23B on the vehicle inner side at a second end without reaching the auxiliary groove 24.

The shoulder land portion lug grooves 25C provided in each of the shoulder land portions 23C are disposed in a row in the tire circumferential direction and intersect the tire circumferential direction. The shoulder land portion lug grooves 25C open at a first end to a design end E, which is the outer end of the tread surface 21 of the tread portion 2 in the tire lateral direction, and terminate at a second end within the shoulder land portion 23C without reaching the shoulder main groove 22B located inward of the shoulder land portion 23C in the tire lateral direction. Accordingly, the shoulder land portions 23C are formed as rib-like land portions. Note that in the present embodiment, the shoulder land portion lug grooves 25C provided in the shoulder land portions 23C are, at the terminating end portion, lug narrow grooves 27 where both the lug grooves 25 and the narrow grooves 26 are present. The communication narrow groove 26E extends from the narrow groove 26 of the lug narrow groove 27 and communicates with the shoulder main grooves 22B. Additionally, terminating end portions of the shoulder land portion lug grooves 25C, which are lug narrow grooves 27, are disposed on the ground contact edges T.

Herein, design end E refers to the outermost end of the tread portion 2 in the tire lateral direction disposed outward of the ground contact edge T in the tire lateral direction, and is the outermost end of the tread portion 2 in the tire lateral direction where grooves are formed. In FIG. 2, the design end E is illustrated as being continuous in the tire circumferential direction. In other words, in the tread portion 2, when the tire is placed on a dry, flat road surface, the region from the ground contact edge T to the design end E is a region which does not typically come into contact with the ground.

Note that the shoulder land portion lug grooves 25C provided in the shoulder land portions 23C terminate within the shoulder land portions 23C and are separated from the through lug grooves 25E described above. However, the first end of the through lug groove 25E, i.e. the end of the middle land portion lug groove 25B provided in the middle land portion 23B on the vehicle outer side that communicates with the shoulder main groove 22B, is disposed on an extension of the end portion where the shoulder land portion lug groove 25C provided in the shoulder land portion 23C on the vehicle outer side terminates within the shoulder land portion 23C. Additionally, the second end of the through lug groove 25E, i.e. the end of the middle land portion lug groove 25B provided in the middle land portion 23B on the vehicle inner side, is disposed on an extension of the end portion where the shoulder land portion lug groove 25C provided in the shoulder land portion 23C on the vehicle inner side terminates within the shoulder land portion 23C. In other words, the lug grooves 25 that include the shoulder land portion lug grooves 25C provided in the shoulder land portions 23C and the through lug grooves 25E (the middle land portion lug grooves 25B of the middle land portion 23B on the vehicle outer side, the center land portion lug grooves 25A of the center land portion 23A, and the middle land portion lug grooves 25B of the middle land portion 23B on the vehicle inner side) are disposed on a smooth, continuous curved line CU that crosses the land portions 23A, 23B, 23C between the outer ends (design ends E) of the tread portion 2 in the tire lateral direction. Curved line CU refers to a line having only tangent lines with an angle ranging from 40° to 90° with respect to the tire lateral direction.

The center land portion narrow grooves 26A of the narrow grooves 26 provided in the center land portion 23A are disposed between adjacent center land portion lug grooves 25A in the tire circumferential direction and intersect the tire circumferential direction. The center land portion narrow grooves 26A communicate with the center main groove 22A on the vehicle inner side of the center land portion 23A at a first end, and terminate within the center land portion 23A at a second end without reaching the center main groove 22A on the vehicle outer side of the center land portion 23A. Additionally, a plurality of the center land portion narrow grooves 26A are disposed in a row in the tire circumferential direction between pairs of the center land portion lug grooves 25A adjacent in the tire circumferential direction. In the present embodiment, two center land portion narrow grooves 26A are disposed in a row in the tire circumferential direction between adjacent center land portion lug grooves 25A in the tire circumferential direction. In an embodiment in which a plurality of the center land portion narrow grooves 26A are disposed in a row in the tire circumferential direction between adjacent center land portion lug grooves 25A in the tire circumferential direction, the first ends and the second ends of the center land portion narrow grooves 26A alternate sides in order in the tire circumferential direction. In other words, as illustrated in FIG. 2, uppermost center land portion narrow groove 26A communicates with the center main groove 22A on the vehicle outer side, the one under that communicates with the center main groove 22A on the vehicle inner side, and the one under that communicates with the center main groove 22A on the vehicle outer side. Thus, the center land portion narrow grooves 26 are disposed so to communicate with the main grooves 22 on alternating sides in the tire lateral direction in order in the tire circumferential direction.

The middle land portion narrow grooves 26B provided in the middle land portion 23B on the vehicle outer side are disposed between adjacent middle land portion lug grooves 25B in the tire circumferential direction and intersect the tire circumferential direction. The middle land portion narrow grooves 26B communicate with the center main groove 22A at the middle land portion 23B at a first end, and terminate within the middle land portions 23B at a second end without reaching the shoulder main groove 22B at the middle land portion 23B. A plurality of the middle land portion narrow grooves 26B of the middle land portion 23B on the vehicle outer side are disposed in a row in the tire circumferential direction between pairs of the middle land portion lug grooves 25B adjacent in the tire circumferential direction. In the present embodiment, two middle land portion narrow grooves 26B of the middle land portion 23B on the vehicle outer side are disposed in a row in the tire circumferential direction between adjacent middle land portion lug grooves 25B in the tire circumferential direction. In an embodiment in which a plurality of the middle land portion narrow grooves 26B of the middle land portion 23B on the vehicle outer side are disposed in a row in the tire circumferential direction between adjacent middle land portion lug grooves 25B in the tire circumferential direction, the first ends and the second ends of the middle land portion narrow grooves 26B alternate sides in order in the tire circumferential direction. In other words, as illustrated in FIG. 2, uppermost middle land portion narrow groove 26B of the middle land portion 23B communicates with the shoulder main groove 22B, the one under that communicates with the center main groove 22A, and the one under that communicates with the shoulder main groove 22B on the vehicle outer side. Thus, the middle land portion narrow groove 26B are disposed so to communicate with the main grooves 22 on alternating sides in the tire lateral direction in order in the tire circumferential direction.

The middle land portion narrow grooves 26B provided in the middle land portion 23B on the vehicle inner side are disposed between extensions of adjacent middle land portion lug grooves 25B in the tire circumferential direction and intersect the tire circumferential direction. The middle land portion narrow grooves 26B communicate at both ends with the shoulder main groove 22B at the middle land portion 23B and with the auxiliary groove 24. Thus, the middle land portion narrow grooves 26B provided in the middle land portion 23B on the vehicle inner side divide a portion of the middle land portion 23B between the shoulder main groove 22B and the auxiliary groove 24 into a plurality of blocks disposed in a row in the tire circumferential direction.

The shoulder land portion narrow grooves 26C provided in the shoulder land portions 23C are disposed between adjacent shoulder land portion lug grooves 25C in the tire circumferential direction and intersect the tire circumferential direction. The shoulder land portion narrow grooves 26C communicate with the shoulder main grooves 22B at a first end and terminate at a second end within the shoulder land portions 23C near the outer ends of the tread portion 2 in the tire lateral direction (design ends E), extending beyond the ground contact edges T.

A plurality of the shoulder land portion narrow grooves 26C provided in the shoulder land portion 23C on the vehicle outer side are disposed in a row in the tire circumferential direction between adjacent shoulder land portion lug grooves 25C in the tire circumferential direction. In the present embodiment, two shoulder land portion narrow grooves 26C provided in the shoulder land portion 23C on the vehicle outer side are disposed in a row in the tire circumferential direction between adjacent shoulder land portion lug grooves 25C in the tire circumferential direction.

Note that the shoulder land portions 23C are provided with recessed portions 28 near the outer ends of the tread portion 2 in the tire lateral direction (design ends E). The recessed portions 28 have a circular dimple shape and are formed between adjacent shoulder land portion lug grooves 25C in the tire circumferential direction in two rows in the tire lateral direction, a laterally inner row 28a with two recessed portions 28 in the tire circumferential direction and a laterally outer row 28b with three recessed portions 28 in the tire circumferential direction. Additionally, the recessed portions 28 of the laterally outer row 28b have a larger diameter than those of the laterally inner row 28a. The shoulder land portion narrow grooves 26C provided in the shoulder land portions 23C terminate at the recessed portions 28 at the second ends. In the present embodiment, the shoulder land portion narrow grooves 26C disposed in the shoulder land portion 23C on the vehicle inner side terminate at the recessed portion 28 of the laterally outer row 28b centrally located in the tire circumferential direction. Additionally, the shoulder land portion narrow grooves 26C disposed in the shoulder land portion 23C on the vehicle outer side terminate at the recessed portion 28 of the laterally inner row 28a.

Figure 7:
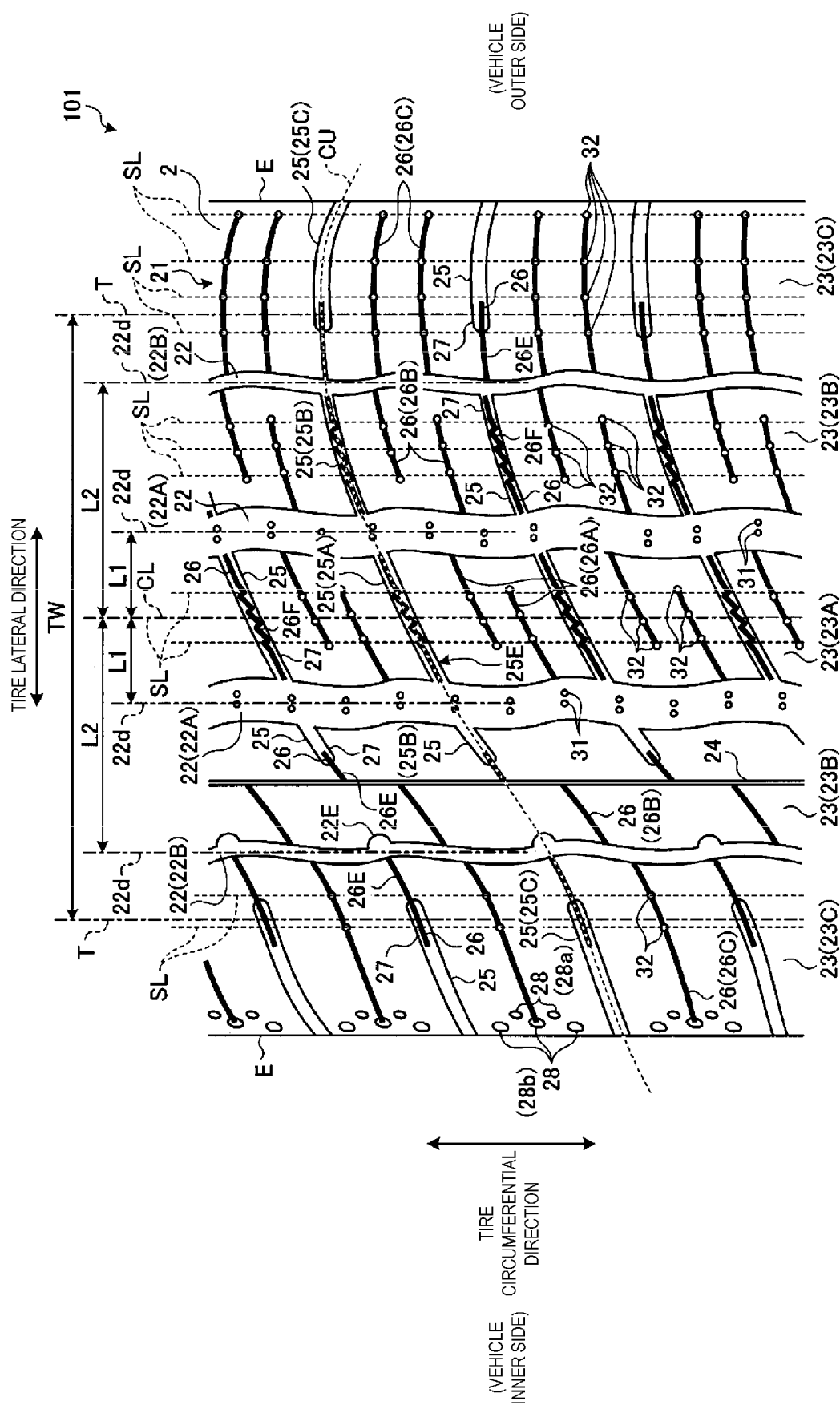
FIG. 7 is a plan view of a tread portion of a pneumatic tire of another example according to an embodiment of the present technology.

FIG. 7 is a plan view of a tread portion of a pneumatic tire according to another example of the present embodiment.

A pneumatic tire 101 according to another example illustrated in FIG. 7 is different from the pneumatic tire 1 described above in that bulge grooves 22E are disposed in the shoulder main groove 22B on the vehicle inner side; in that projections 31 are disposed in the center main grooves 22A; in that the narrow grooves 26 of the lug narrow grooves 27 of the center land portion 23A and the middle land portion 23B on the vehicle outer side are zigzag narrow grooves 26F; in that hole portions 32 are disposed in the center land portion narrow grooves 26A of the center land portion 23A, the middle land portion narrow grooves 26B of the middle land portion 23B on the vehicle outer side, and the shoulder land portion narrow grooves 26C of the shoulder land portions 23C; and in that the recessed portions 28 are disposed in the shoulder land portion 23C on the vehicle outer side. How the pneumatic tire 101 is different will be described below, and portions identical to those of the pneumatic tire 1 described above are denoted with the same reference signs and descriptions thereof are omitted.

A bulge groove 22E with a semi-circular bulge toward the middle land portion 23B on the vehicle inner side is disposed in the shoulder main groove 22B on the vehicle inner side. The bulge groove 22E is disposed so as to bulge toward the middle land portion 23B at a position corresponding to the communication narrow groove 26E provided in the shoulder land portion 23C on the vehicle inner side.

Figure 8:
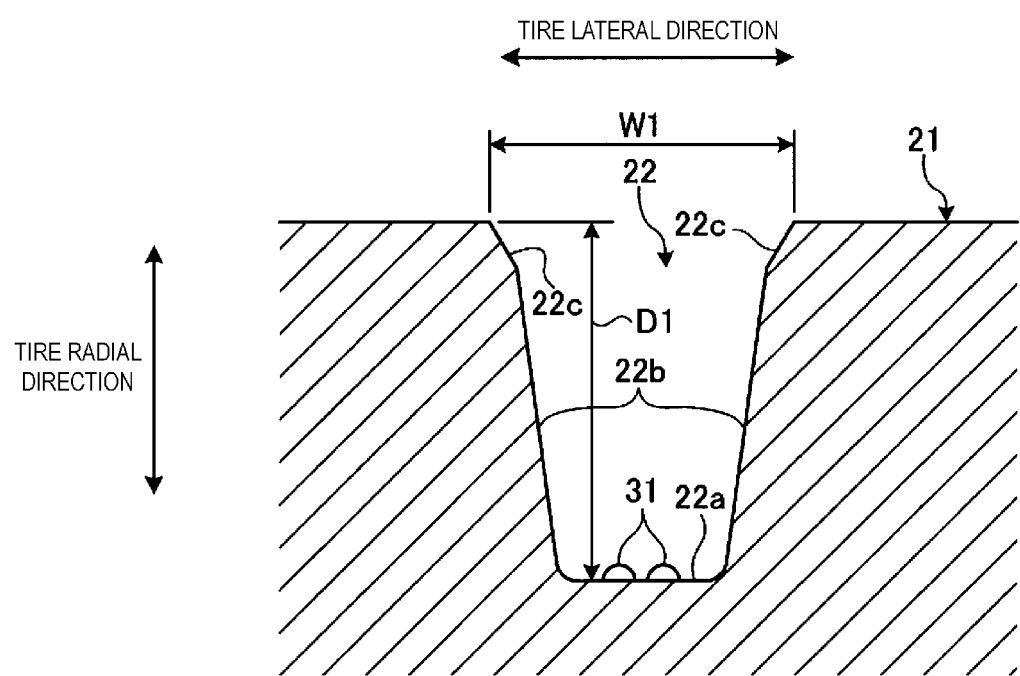
FIG. 8 is an enlarged cross-sectional view of a main groove of a pneumatic tire according to another example of an embodiment of the present technology.

As illustrated in the enlarged cross-sectional view of a main groove of FIG. 8, the projection 31 is provided projecting from the groove bottom 22a of the center main groove 22A. The projection 31 has a hemispherical shape with a smooth curved surface that projects from the groove bottom 22a of the center main groove 22A. A plurality of the projections 31 are provided in the tire circumferential direction in accord with the periodic oscillations of the center main groove 22A. A plurality of rows (two in the present embodiment) of projections 31 provided in the tire circumferential direction in accord with the periodic oscillations are provided in the tire lateral direction. The projections 31 are formed with a lower projection height from the groove bottom 22a than a wear indicator (not illustrated) disposed on the groove bottom 22a of the center main groove 22A. The wear indicator is a projection within the main groove 22 that allows the degree of wear to be visually determined. The wear indicator of a tire for a passenger vehicle has a specified height from the groove bottom 22a of 1.6 mm. Thus, the projections 31 project from the groove bottom 22a with a height of less than 1.6 mm. Such a projection 31 preferably has a hemispherical shape with a diameter ranging from 0.4 mm to 1.5 mm and a projection height ranging from 0.2 mm to less than 1.6 mm. Note that the projection 31 may also be provided on the groove bottom 22a of the shoulder main grooves 22B. Additionally, the projection 31 may also be provided on the groove bottom 22a of only one of the shoulder main grooves 22B.

The zigzag narrow grooves 26F are narrow grooves 26 formed in a zigzag shape provided in the groove bottom 25a of the lug grooves 25 of the lug narrow groove 27 of the center land portion 23A and the middle land portion 23B on the vehicle outer side. The zigzag narrow grooves 26F have a zigzag shape within the groove width W2 of the center land portion lug grooves 25A of the center land portion 23A and the groove width W2 of the middle land portion lug grooves 25B of the middle land portion 23B on the vehicle outer side. The zigzag narrow grooves 26F have a groove width W3 and a groove depth D3 similar to that of the narrow grooves 26 of the lug narrow grooves 27 described above. The zigzag narrow grooves 26F oscillate at least three or more times within one lug narrow groove 27. Additionally, one oscillation of the zigzag narrow grooves 26F is formed by a short narrow groove and a long narrow groove. This oscillation is repeated.

The hole portions 32 are disposed in the narrow grooves 26 including center land portion narrow grooves 26A of the center land portion 23A, the middle land portion narrow grooves 26B of the middle land portion 23B on the vehicle outer side, and the shoulder land portion narrow grooves 26C of the shoulder land portions 23C. The hole portions 32 expand the narrow grooves 26A, 26B, 26C in parts, and preferably, for example, have a circular shape in a plan view with a diameter ranging from 0.5 mm to 1.0 mm and a depth ranging from 3 mm to 6 mm. The hole portions 32 are disposed in the extension direction of the narrow grooves 26A, 26B, 26C. The center land portion narrow grooves 26A of the center land portion 23A and the middle land portion narrow grooves 26B of the middle land portion 23B on the vehicle outer side terminate at one end within the respective land portions 23A, 23B, and a total of three hole portions 32 are disposed in each narrow groove 26A, 26B, with one at the terminating end and a plurality (two in the present embodiment) disposed partway along the narrow grooves 26A, 26B. Note that as no recessed portions 28 are provided in the shoulder land portion 23C on the vehicle outer side, the shoulder land portion narrow grooves 26C of the shoulder land portion 23C on the vehicle outer side terminate at the second end within the shoulder land portion 23C on the vehicle outer side, and the hole portions 32 are provided at the terminating ends. Additionally, a total of four hole portions 32 are disposed in each shoulder land portion narrow groove 26C with a plurality (three in the present embodiment) disposed partway along the shoulder land portion narrow grooves 26C. In other words, the center land portion narrow grooves 26A of the center land portion 23A, the middle land portion narrow grooves 26B of the middle land portion 23B on the vehicle outer side, and the shoulder land portion narrow grooves 26C of the shoulder land portion 23C on the vehicle outer side terminate at the hole portions 32. Additionally, the shoulder land portion narrow grooves 26C of the shoulder land portion 23C on the vehicle inner side terminate at the second end at the recessed portions 28, and a total of two hole portions 32 are disposed in each narrow groove 26A with a plurality (two in the present embodiment) disposed partway along the narrow groove 26C.

The hole portions 32 provided in the center land portion 23A and the hole portions 32 provided in the middle land portion 23B on the vehicle outer side are disposed in rows in the tire circumferential direction and positioned offset in the tire lateral direction with respect to straight lines SL (including the tire equator line CL) in the tire circumferential direction. Specifically, the hole portions 32 provided in the center land portion 23A and the hole portions 32 provided in the middle land portion 23B on the vehicle outer side are disposed in rows in the tire circumferential direction and disposed partially on the straight lines SL (including the tire equator line CL) in the tire circumferential direction with positions offset in the tire lateral direction. Additionally, the hole portions 32 provided in the shoulder land portions 23C are disposed in rows in the tire circumferential direction and positioned on the straight lines SL in the tire circumferential direction without being offset in the tire lateral direction. Note that the hole portions 32 are not disposed in the middle land portion narrow grooves 26B of the middle land portion 23B on the vehicle inner side.

In such a manner, the pneumatic tire 1, 101 of the present embodiment includes the tread surface 21 of the tread portion 2 including a plurality of main grooves 22 extending in the tire circumferential direction and a plurality of land portions 23 adjacent to one another formed by the main grooves 22. At least two main grooves 22 adjacent in the tire lateral direction have a wave-like shape with periodic oscillation. The lug grooves 25 (the center land portion lug grooves 25A and/or the middle land portion lug grooves 25B on the vehicle outer side) are disposed in the land portions(s) 23 formed between the wave-like main grooves 22 (the center land portion 23A and/or the middle land portion 23B on the vehicle outer side) in a row in the tire circumferential direction, intersect the tire circumferential direction, and communicate with the main grooves 22 at both ends. The narrow grooves 26 (the center land portion narrow grooves 26A and/or the middle land portion narrow grooves 26B on the vehicle outer side) are disposed between pairs of the lug grooves 25 adjacent in the tire circumferential direction in a row in the tire circumferential direction, intersect the tire circumferential direction, and have a narrower groove width than the lug grooves 25.

According to the pneumatic tire 1, 101, two main grooves 22 adjacent in the tire lateral direction have a wave-like shape with periodic oscillation. This increases the overall width of the main grooves 22 and provides good drainage properties, and allows braking performance on wet road surfaces to be maintained. Furthermore, according to the pneumatic tire 1, 101, the lug groove 25 are disposed in a row in the tire circumferential direction and communicate with the wave-like main grooves 22 at both ends. This allows good drainage properties to be provided, and braking performance on wet road surfaces to be maintained. Additionally, according to the pneumatic tire 1, 101, by the narrow grooves 26 being disposed between pairs of the lug grooves 25 adjacent in the tire circumferential direction, good drainage properties can be provided, the braking performance on wet road surfaces can be maintained, and by the narrow grooves 26 communicating with the main groove 22 at the first end and terminating within the land portion 23 at the second end and having a narrower groove width than the lug grooves 25, a decrease in the rigidity of the land portions 23 between the wave-like main grooves 22 can be suppressed and wear resistance performance can be improved.

Preferably, in the pneumatic tire 1, 101 of the present embodiment, four main grooves 22 are provided in the tread surface 21, each having periodic oscillation. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. The center land portion 23A and one of the middle land portions 23B (on the vehicle outer side) are provided with the lug grooves 25 and the narrow grooves 26.

According to the pneumatic tire 1, 101, the center land portion 23A and one of the adjacent middle land portions 23B on either side of the center land portion 23A in the tire lateral direction have good drainage properties. This allows braking performance on wet road surfaces to be maintained. Also, by suppressing a decrease in rigidity of the center land portion 23A and one of the adjacent middle land portions 23B on either side of the center land portion 23A, the obtained effect of improving wear resistance performance can be significant.

Preferably, in the pneumatic tire 1, 101 of the present embodiment, the other middle land portion 23B (on the vehicle inner side) is provided with the auxiliary groove 24 having a narrower groove width than the main grooves 22 and extending in a linear manner in the tire circumferential direction; and the middle land portion narrow grooves 26B disposed in a row in the tire circumferential direction that intersect the tire circumferential direction, the middle land portion narrow grooves 26B each communicating with the main groove 22 located outwardly adjacent in the tire lateral direction and the auxiliary groove 24 at both ends and having a narrower groove width than the lug grooves 25.

According to the pneumatic tire 1, 101, the middle land portion 23B greatly contribute to drainage properties, and so by the middle land portion 23B being provided with the auxiliary groove 24 extending in a linear manner in the tire circumferential direction and the middle land portion narrow grooves 26B, good drainage properties are provided, and thus the braking performance on wet road surfaces can be improved. Furthermore, the auxiliary groove 24 has a narrower groove width than the main grooves 22, and the middle land portion narrow grooves 26B have a narrower groove width than the lug grooves 25. Thus, a decrease in the rigidity of the middle land portion 23B can be suppressed, and wear resistance performance can be improved.

Preferably, in the pneumatic tire 1, 101 of the present embodiment, the other middle land portion 23B (on the vehicle inner side) is provided with the middle land portion lug grooves 25B disposed in a row in the tire circumferential direction, the middle land portion lug grooves 25B intersecting the tire circumferential direction, communicating with the main groove 22 located inward in the tire lateral direction at the first end, and terminating within the other middle land portion 23B at the second end without reaching the auxiliary groove 24; and the communication narrow grooves 26E connecting the terminating ends of the middle land portion lug grooves 25B and the auxiliary groove 24 and having a narrower groove width than the middle land portion lug grooves 25B.

According to the pneumatic tire 1, 101, in the other middle land portion 23B, the other middle land portion 23B is provided with the middle land portion lug grooves 25B that communicate with the main groove 22 located inward in the tire lateral direction at the first end and terminate within the other middle land portion 23B at the second end without reaching the auxiliary groove 24 and the communication narrow grooves 26E that connect the terminating ends of the middle land portion lug groove 25B and the auxiliary grooves 24. This provides good drainage properties and allows braking performance on wet road surfaces to be further maintained. Furthermore, the middle land portion lug grooves 25B that terminate within the middle land portion 23B are provided and the communication narrow grooves 26E have a narrower groove width than the middle land portion lug grooves 25B. This allows a decrease in the rigidity of the middle land portions 23B to be suppressed and wear resistance performance to be improved.

Preferably, in the pneumatic tire 1, 101 according to the present embodiment, the lug narrow grooves 27 in which the lug groove 25 and the narrow groove 26 are present are disposed between the middle land portion lug grooves 25B and the communication narrow grooves 26E.

According to the pneumatic tire 1, 101, the lug narrow grooves 27 are disposed between the middle land portion lug grooves 25B and the communication narrow grooves 26E. This allows excessive changes in rigidity at the communicating portion between the middle land portion lug grooves 25B and the communication narrow grooves 26E to be suppressed, and wear resistance performance to be improved.

Preferably, in the pneumatic tire 1, 101 of the present embodiment, the shoulder land portions 23C are provided with the shoulder land portion lug grooves 25C disposed in a row in the tire circumferential direction that intersect the tire circumferential direction, the shoulder land portion lug grooves 25C terminating without reaching the main groove 22 located inward in the tire lateral direction of the shoulder land portion 23C (the shoulder main groove 22B); and the shoulder land portion narrow grooves 26C disposed between pairs of the shoulder land portion lug grooves 25C adjacent in the tire circumferential direction that intersect the tire circumferential direction, the shoulder land portion narrow grooves 26C communicating with the main groove 22 located inward of the shoulder land portion 23C in the tire lateral direction at an end portion and having a narrower groove width than the shoulder land portion lug grooves 25C.

According to the pneumatic tire 1, 101, the shoulder land portion narrow grooves 26C provide good drainage properties in the shoulder land portions 23C, and the terminating ends within the shoulder land portion 23C allow a decrease in rigidity of the shoulder land portion 23C to be suppressed and wear resistance performance to be improved. Furthermore, according to the pneumatic tire 1, 101, the shoulder land portion narrow grooves 26C provide good drainage properties and allow braking performance on wet road surfaces to be improved. Additionally, the shoulder land portion narrow grooves 26C have a narrower groove width than the shoulder land portion lug grooves 25C. This allows a decrease in rigidity of the shoulder land portions 23C to be suppressed and wear resistance performance to be improved.

Preferably, in the pneumatic tire 1, 101 of the present embodiment, the shoulder land portion narrow grooves 26C are provided in one of the shoulder land portions 23C (on the vehicle outer side) disposed between pairs of the shoulder land portion lug grooves 25C adjacent in the tire circumferential direction in a row in the tire circumferential direction.

According to the pneumatic tire 1, 101, the shoulder land portion narrow grooves 26C disposed in a row in the tire circumferential direction provide good drainage properties and allow braking performance on wet road surfaces to be improved.

Preferably, in the pneumatic tire 1, 101 of the present embodiment, the communication narrow grooves 26E are provided connecting the terminating ends of the shoulder land portion lug grooves 25C and the main groove 22 located inward of the shoulder land portion 23C in the tire lateral (the shoulder main groove 22B), and have a narrower groove width than the shoulder land portion lug grooves 25C.

According to the pneumatic tire 1, 101, the communication narrow grooves 26E that connect the terminating ends of the shoulder land portion lug grooves 25C and the main groove 22 provide good drainage properties and allow braking performance on wet road surfaces to be further maintained. Furthermore, the shoulder land portion lug grooves 25C that terminate within the shoulder land portions 23C are provided and the communication narrow grooves 26E have a narrower groove width than the shoulder land portion lug grooves 25C. This allows a decrease in the rigidity of the shoulder land portions 23C to be suppressed and wear resistance performance to be improved.

Preferably, in the pneumatic tire 1, 101 according to the present embodiment, the lug narrow grooves 27 in which the lug groove 25 and the narrow groove 26 are present are disposed between the shoulder land portion lug grooves 25C and the communication narrow grooves 26E.

According to the pneumatic tire 1, 101, the lug narrow grooves 27 are disposed between the shoulder land portion lug grooves 25C and the communication narrow grooves 26E. This allows excessive changes in rigidity at the communicating portion between the shoulder land portion lug grooves 25C and the communication narrow grooves 26E to be suppressed, and wear resistance performance to be improved.

Preferably, in the pneumatic tire 101 of the present embodiment, the main groove 22 (the shoulder main groove 22B) located inward of one of the shoulder land portions 23C (on the vehicle inner side) in the tire lateral direction is provided with the bulge grooves 22E that bulge toward the other adjacent middle land portion 23B (on the vehicle inner side) at positions corresponding to the communication narrow grooves 26E.

According to the pneumatic tire 101, the bulge grooves 22E are provided bulging toward the other adjacent middle land portion 23B (on the vehicle inner side) at positions corresponding to the communication narrow grooves 26E. This allows the bulge grooves 22E to function as a catchment for discharging water to the communication narrow grooves 26E, and allows braking performance on wet road surfaces to be further maintained.

Preferably, in the pneumatic tire 1, 101 of the present embodiment, the shoulder land portions 23C are provided with recessed portions 28 at the outer ends in the tire lateral direction, and the shoulder land portion narrow grooves 26C terminate at the recessed portions 28 at the outer end portion in the tire lateral direction.

According to the pneumatic tire 1, 101, the outer end portions of the shoulder land portion narrow grooves 26C in the tire lateral direction terminate at the recessed portions 28. This prevents loads acting on the outer end portions of the shoulder land portion narrow grooves 26C in the tire lateral direction, and allows a decrease in rigidity of the shoulder land portions 23C to be suppressed and wear resistance performance to be improved.

The pneumatic tire 101 of the present embodiment includes the tread surface 21 of the tread portion 2 including the main grooves 22 extending in the tire circumferential direction and the land portions 23 adjacent to one another in the tire lateral direction formed by the main grooves 22. At least one of the main grooves 22 has a wave-like shape with periodic oscillation. The groove bottom 22a of the wave-like main groove 22 is provided with the projections 31 disposed in a row in the tire circumferential direction in accord with the periodic oscillations of the main groove 22.

According to the pneumatic tire 101, the main grooves 22 have a wave-like shape with periodic oscillation. This increases the overall width of the main grooves 22 and provides good drainage properties, and allows braking performance on wet road surfaces to be improved. Furthermore, according to the pneumatic tire 101, the projections 31 provided on the groove bottom 22a of the wave-like main grooves 22 makes the water at the groove bottom 22a of the main groove 22 turbulent to spread out and discharge the water out of the main groove 22. This allows good drainage properties to be provided and braking performance on wet road surfaces to be improved.

Preferably, in the pneumatic tire 101 of the present embodiment, the projections 31 are disposed in a plurality of rows in the tire lateral direction.

According to the pneumatic tire 101, the projections 31 are disposed in rows in the tire lateral direction. This allows the water located outward of the main groove 22 in the tire lateral direction to be spread out and discharged.

Thus, drainage properties can be further improved and braking performance on wet road surfaces can be improved.

Preferably, in the pneumatic tire 101 of the present embodiment, the projections 31 are formed with a lower projection height from the groove bottom 22a than a wear indicator disposed on the groove bottom 22a of the main groove 22.

According to the pneumatic tire 101, the projections 31 are formed with a lower projection height from the groove bottom 22a than a wear indicator, which is a projection within the main groove 22 that allows the degree of wear to be visually determined. This prevents the function of the wear indicator being inhibited by the projections 31.

Preferably, in the pneumatic tire 101 of the present embodiment, four main grooves 22 are provided in the tread surface 21, each having periodic oscillation. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. The projections 31 are disposed in the main grooves 22 (center main groove 22A) between the center land portion 23A and the middle land portions 23B.

According to the pneumatic tire 101, the projections 31 are disposed to provide good drainage properties in the main grooves 22 between the middle land portions 23B on either side of the center land portion 23A, which is the center land portion 23A in the center of the tread surface 21 that contributes to the braking performance on wet road surfaces. This allows a significant effect of improving braking performance on wet road surfaces to be obtained.

The pneumatic tire 101 of the present embodiment includes the tread surface 21 of the tread portion 2 including the main grooves 22 extending in the tire circumferential direction and the land portions 23 adjacent to one another formed by the main grooves 22. Adjacent main grooves 22 in the tire lateral direction have a wave-like shape with periodic oscillation. The lug grooves 25 are disposed in the land portions 23 formed between the wave-like main grooves 22 adjacent in the tire lateral direction in a row in the tire circumferential direction, intersect the tire circumferential direction, and communicate with the main grooves 22 at both ends. The zigzag narrow grooves 26F are disposed in the groove bottoms 25a of the lug grooves 25 with a zigzag shape in the extension direction of the lug grooves 25 and have a narrower groove width than the lug grooves 25.

According to the pneumatic tire 101, the main grooves 22 have a wave-shape with periodic oscillation. This increases the overall width of the main grooves 22 and provides good drainage properties, and allows braking performance on wet road surfaces to be maintained. Furthermore, according to the pneumatic tire 101, the lug grooves 25 and the zigzag narrow grooves 26F provide good drainage properties, and how the zigzag narrow grooves 26F mate suppresses a decrease in rigidity of the land portions 23 divided by the lug grooves 25. This allows wear resistance performance to be improved.

Preferably, in the pneumatic tire 101 of the present embodiment, the zigzag narrow grooves 26F have the groove depth D3 which is 70% or greater of the overall groove depth of the lug groove 25 including the groove depth D2.

According to the pneumatic tire 101, the zigzag narrow grooves 26F have a groove depth that is 70% or greater of the overall groove depth. This allows a significant effect of providing good drainage properties and a significant effect of improving wear resistance performance to be obtained.

Preferably, in the pneumatic tire 101 of the present embodiment, the zigzag narrow grooves 26F oscillate at least three or more times.

According to the pneumatic tire 101, the zigzag narrow grooves 26F oscillate three or more times. This allows the obtained effect of improving wear resistance performance to be significant. Preferably, one oscillation of the zigzag narrow grooves 26F is formed by a short narrow groove and a long narrow groove, and this oscillation is repeated. This allows a decrease in rigidity of the land portions 23 divided by the lug grooves 25 to be further suppressed, and the obtained effect of improving wear resistance performance to be more significant.

Preferably, in the pneumatic tire 101 of the present embodiment, four main grooves 22 are provided in the tread surface 21, each having periodic oscillation. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. The center land portion 23A and one of the middle land portions 23B (on the vehicle outer side) are provided with the lug grooves 25 and the zigzag narrow grooves 26F. The other middle land portion 23B (on the vehicle inner side) and the shoulder land portion 23C are provided with the lug grooves 25 without a zigzag narrow groove 26F disposed in a row in the tire circumferential direction that intersect the tire circumferential direction. The lug grooves 25 are disposed on the smooth, continuous curved line CU that crosses the land portions 23A, 23B, 23C between the outer ends of the tread portion 2 in the tire lateral direction.

According to the pneumatic tire 101, the lug grooves 25 are disposed on the smooth, continuous curved line CU that crosses the land portions 23A, 23B, 23C between the outer ends of the tread portion 2 in the tire lateral direction. This allows good drainage properties to be provided between the land portions 23A, 23B, 23C, and braking performance on wet road surfaces to be maintained. Furthermore, the lug grooves 25 are disposed on the smooth, continuous curved line CU that crosses the land portions 23A, 23B, 23C between the outer ends of the tread portion 2 in the tire lateral direction. This allows an excessive difference in rigidity between the land portions 23A, 23B, 23C in the tire lateral direction to be suppressed. Thus, wear resistance performance can be improved.

Additionally, the pneumatic tire 101 of the present embodiment includes the tread surface 21 of the tread portion 2 provided with a plurality of main grooves 22 extending in the tire circumferential direction and a plurality of land portions 23 adjacent to one another formed by the main grooves 22. The main grooves 22 have a wave-like shape with periodic oscillation. The lug grooves 25 are disposed in the land portions 23 in a row in the tire circumferential direction and intersect the tire circumferential direction. The narrow grooves 26 are disposed between pairs of the lug grooves 25 adjacent in the tire circumferential direction in a row in tire circumferential direction, intersect the tire circumferential direction, and have a narrower groove width than the lug grooves 25. The hole portions 32 are formed in the narrow grooves 26.

According to the pneumatic tire 101, the main grooves 22 have a wave-like shape with periodic oscillation. This increases the overall width of the main grooves 22 and provides good drainage properties, and allows braking performance on wet road surfaces to be maintained. Additionally, according to the pneumatic tire 101, in addition to providing good drainage properties with the lug grooves 25 and the narrow grooves 26, a decrease in the rigidity of the land portions 23 is suppressed by the narrow grooves 26 having a groove width less than that of the lug grooves 25. As a result, wear resistance performance can be improved. Also, the effect of suppressing a decrease in the rigidity of the land portions 23 is maintained by the narrow grooves 26, and the hole portions 32 further improve drainage properties. As a result, braking performance on wet road surfaces can be maintained.

Preferably, in the pneumatic tire 101 of the present embodiment, four main grooves 22 are provided in the tread surface 21, each having periodic oscillation. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. A plurality of narrow grooves 26 including the hole portions 32 are disposed in the center land portion 23A and one of the middle land portions 23B (on the vehicle outer side) in a row in the tire circumferential direction. The narrow grooves 26 having the hole portions 32 communicate with one of the main grooves 22 at the first end and terminate within the land portion 23 at the second end without reaching the other main groove 22, with the first ends and the second ends alternating sides in the tire lateral direction in the tire circumferential direction.

According to the pneumatic tire 101, the center land portion 23A and one of the middle land portions 23B (on the vehicle outer side) are land portions 23 that contribute to braking performance on wet road surfaces. The narrow grooves 26 having the hole portions 32 disposed in the land portions 23A, 23B in a row in the tire circumferential direction provide good drainage properties and improve braking performance on wet road surfaces. By the narrow grooves 26 having the hole portions 32 terminating within the land portion 23 at the second end and having the first end and second end alternating sides in the tire lateral direction in the tire circumferential direction, the rigidity of the land portions 23 can be made uniform. As a result, wear resistance performance can be improved.

Preferably, in the pneumatic tire 101 according to the present embodiment, the hole portions 32 provided in the center land portion 23A and the hole portions 32 provided in one of the middle land portions 23B (on the vehicle outer side) are disposed in rows in the tire circumferential direction and positioned offset in the tire lateral direction with respect to straight lines SL in the tire circumferential direction.

According to the pneumatic tire 101, by the hole portions 32 having positions offset in the tire lateral direction with respect to the straight lines SL in the tire circumferential direction, cracking between the hole portions 32 in the tire circumferential direction between the narrow grooves 26 disposed in a row in the tire circumferential direction can be suppressed.

Preferably, in the pneumatic tire 101 according to the present embodiment, the hole portions 32 provided in the center land portion 23A and the hole portions 32 provided in one of the middle land portions 23B (on the vehicle outer side) are disposed in rows in the tire circumferential direction and disposed partially on the straight lines SL in the tire circumferential direction with positions offset in the tire lateral direction.

According to the pneumatic tire 101, by the hole portions 32 having positions offset in the tire lateral direction with respect to the straight lines SL in the tire circumferential direction, cracking between the hole portions 32 in the tire circumferential direction between the narrow grooves 26 disposed in a row in the tire circumferential direction can be suppressed. By the hole portions 32 being disposed partially on the straight lines SL in the tire circumferential direction, this offset positioning in the tire circumferential direction of the hole portions 32 suppresses non-uniformity of the rigidity of the center land portion 23A and one of the middle land portions 23B (on the vehicle outer side). As a result, wear resistance performance can be improved.

Preferably in the pneumatic tire 101 of the present embodiment, the shoulder land portions 23C are provided with the narrow grooves 26 including the hole portions 32.

According to the pneumatic tire 101, in addition to providing good drainage properties in the shoulder land portions 23C with the narrow grooves 26, a decrease in the rigidity of the shoulder land portions 23C is suppressed by the narrow grooves 26 having a groove width less than that of the lug grooves 25. As a result, wear resistance performance can be improved. Also, an effect of suppressing a decrease in the rigidity of the land portions 23 is maintained by the narrow grooves 26, and the hole portions 32 further improve drainage properties. As a result, braking performance on wet road surfaces can be maintained.

Preferably in the pneumatic tire 101 of the present embodiment, the hole portions 32 provided in the shoulder land portions 23C are disposed in rows in the tire circumferential direction and positioned on the straight lines SL in the tire circumferential direction.

According to the pneumatic tire 101, non-uniformity of the rigidity of the shoulder land portions 23C in the tire circumferential direction caused by the positions of the hole portions 32 can be suppressed, and thus wear resistance performance can be improved.

Preferably, in the pneumatic tire 101 of the present embodiment, the other middle land portion 23B (on the vehicle inner side) is provided with the auxiliary groove 24 having a narrower groove width than the main grooves 22 and extending in a linear manner in the tire circumferential direction, and the middle land portion narrow grooves 26B without the hole portions 32 that communicate with the main groove 22 located outwardly adjacent in the tire lateral direction and the auxiliary groove 24 at both ends and have a narrower groove width than the lug grooves 25.

According to the pneumatic tire 101, the middle land portion 23B greatly contribute to drainage properties, and so by the middle land portion 23B being provided with the auxiliary groove 24 extending in a linear manner in the tire circumferential direction and the middle land portion narrow grooves 26B, good drainage properties can be provided, and thus the braking performance on wet road surfaces can be improved. Furthermore, the middle land portion 23B, though including the auxiliary groove 24, is not provided with the hole portions 32. Thus, a decrease in the rigidity of the middle land portion 23B can be suppressed, and wear resistance performance can be improved.

EXAMPLES

In the examples, performance tests for wear resistance performance and braking performance on wet road surfaces were performed on a plurality of types of pneumatic tires of different conditions (see FIGS. 9 and 10).

In these performance tests, pneumatic tires having a tire size of 205/55R16 were assembled on 16×65J rims, inflated to the regular internal pressure (200 kPa), and mounted on a test vehicle (1600 cc, front engine front wheel drive sedan passenger vehicle).

Wear resistance performance was evaluated by driving the test vehicle described above on a test course with a dry road surface for 5000 km and then measuring the wear of the land portions via the amount of main groove remaining. Then, the measurement results were expressed as index values with the value of Conventional Example being defined as the reference (100). In this evaluation, larger values indicate less wear, which is preferable.

Braking performance on wet road surfaces was evaluated by measuring the braking distance of the test vehicle from a speed of 100 km/h on a wet road surface test course with a water depth of 1 mm. Then, the measurement results were expressed as index values with the value of the Conventional Example being defined as the reference (100). In this evaluation, larger values indicate less braking distance, which is preferable.

In FIGS. 9 and 10, the pneumatic tires that were used as the test tires had a configuration including five land portions formed by four main grooves on the tread surface, the land portions including the center land portion disposed on the tire equatorial plane CL, the middle land portions disposed adjacent to the center land portion on the two sides in the tire lateral direction, and the shoulder land portions disposed adjacent to the middle land portions on the outer sides in the tire lateral direction.

The pneumatic tire of Conventional Example indicated in FIG. 9 include main grooves that oscillate in a wave-like manner. In the conventional pneumatic tire, the lug grooves communicate with the land portions at both ends. Additionally, in the conventional pneumatic tire, the narrow grooves disposed in the center land portion and the middle land portions are sets of two, each communicating with the main grooves at both ends.

In the pneumatic tires of Examples 1 to 12 indicated in FIGS. 9 and 10, the main grooves oscillate in a wave-like manner, the lug grooves communicate with the land portions at both ends, and the narrow grooves of the center land portion and the middle land portions are sets of two with the second end portion terminating within the land portion. The pneumatic tires of Examples 3 to 12 include the lug grooves and the narrow grooves described above in the center land portion and one of the middle land portions (on the vehicle outer side). The pneumatic tires of Examples 4 to 12 include an auxiliary groove and narrow grooves that communicate with the main groove and the auxiliary groove at both end portions disposed in the other middle land portion (on the vehicle inner side). The pneumatic tires of Examples 5 to 12 include lug grooves that communicate with the main groove at the first end and terminate within the middle land portion at the second end (one of the end portions) without reaching the auxiliary groove, and communication narrow grooves that communicate with the terminating ends of the lug grooves. In the pneumatic tires of Examples 6 to 12, lug narrow grooves in which a lug groove and a narrow groove are present are disposed between the lug grooves of the other middle land portion (on the vehicle inner side) and the communication narrow groove. The pneumatic tire of Examples 7 to 12 include, in the shoulder land portions, lug grooves that terminate without communicating with the main grooves and one narrow groove disposed between each lug groove that communicates with the main groove at one end portion. The pneumatic tires of Examples 8 to 12 include, in one of the shoulder land portions (on the vehicle outer side), two narrow grooves disposed in the tire circumferential direction in a row in between pairs of lug grooves. The pneumatic tires of Examples 9 to 12 include, in the shoulder land portions, communication narrow grooves that communicate with terminating ends of the lug grooves and the main grooves. In the pneumatic tires of Examples 10 to 12, in the shoulder land portions, lug narrow groove in which a lug groove and a narrow groove is present are disposed between the lug grooves and the communication narrow grooves. In the pneumatic tires of Example 11 and 12, the main groove located inward of the other shoulder land portion (on the vehicle inner side) in the tire lateral direction is provided with bulge grooves that bulge toward the other adjacent middle land portion (on the vehicle inner side) at positions corresponding to the communication narrow grooves. In the pneumatic tire of Example 12, in the shoulder land portions, recessed portions are formed at the outer ends in the tire lateral direction, and the narrow grooves terminate at the recessed portions.

As can be seen from the test results of FIGS. 9 and 10, the pneumatic tires of Examples 1 to 12 provided enhanced wear resistance performance while maintaining braking performance on wet road surfaces.

The invention claimed is:

1. A pneumatic tire, comprising:
a tread surface of a tread portion comprising
a plurality of main grooves extending in a tire circumferential direction, at least two of the plurality of main grooves adjacent in the tire circumferential direction having a wave-like shape with periodic oscillation, the plurality of main grooves comprising four main grooves each having periodic oscillation;
a plurality of land portions adjacent to one another in a tire lateral direction formed by the plurality of main grooves, the plurality of land portions comprising a center land portion, middle land portions adjacent to the center land portion on either side in the tire lateral direction and shoulder land portions outwardly adjacent to the middle land portions in the tire lateral direction;
the center land portion and a first middle land portion of the middle land portions comprising a plurality of lug grooves and a plurality of narrow grooves;
the plurality of lug grooves disposed in a row in the tire circumferential direction in each of the center land portion and the first middle land portion formed between the main grooves having the wave-like shape, the plurality of lug grooves each intersecting the tire circumferential direction and communicating at both ends with the main grooves having the wave-like shape; and
the plurality of narrow grooves disposed between pairs of the plurality of lug grooves adjacent in the tire circumferential direction in a row in the tire circumferential direction, the plurality of narrow grooves each intersecting the tire circumferential direction, communicating with one of the main grooves at a first end, terminating within the center land portion and the first middle land portion at a second end, and having a narrower groove width than the plurality of lug grooves;
a second middle land portion of the middle land portions comprising an auxiliary groove that extends in a linear manner in the tire circumferential direction and has a narrower groove width than the plurality of main grooves; and
a plurality of through lug grooves continuously passing through the first middle land portion and the center land portion and terminating within the second middle land portion without reaching the auxiliary groove.

2. The pneumatic tire according to claim 1, wherein:
the auxiliary groove divides the second middle land portion into rib land portions adjacent in the tire lateral direction; and
the rib land portions are not divided in the tire circumferential direction by the lug grooves.

3. The pneumatic tire according to claim 1, wherein the auxiliary groove has a groove width ranging from 1 mm to 3 mm.

4. A pneumatic tire, comprising:

a tread surface of a tread portion comprising a plurality of main grooves extending in a tire circumferential direction, at least two of the plurality of main grooves adjacent in the tire circumferential direction having a wave-like shape with periodic oscillation, the plurality of main grooves comprising four main grooves each having periodic oscillation;

a plurality of land portions adjacent to one another in a tire lateral direction formed by the plurality of main grooves, the plurality of land portions comprising a center land portion, middle land portions adjacent to the center land portion on either side in the tire lateral direction and shoulder land portions outwardly adjacent to the middle land portions in the tire lateral direction;

the center land portion and a first middle land portion of the middle land portions comprising a plurality of lug grooves and a plurality of narrow grooves;

the plurality of lug grooves disposed in a row in the tire circumferential direction in each of the center land portion and the first middle land portion formed between the main grooves having the wave-like shape, the plurality of lug grooves each intersecting the tire circumferential direction and communicating at both ends with the main grooves having the wave-like shape; and the plurality of narrow grooves disposed between pairs of the plurality of lug grooves adjacent in the tire circumferential direction in a row in the tire circumferential direction, the plurality of narrow grooves each intersecting the tire circumferential direction, communicating with one of the main grooves at a first end, terminating within the center land portion and the first middle land portion at a second end, and having a narrower groove width than the plurality of lug grooves;

a second middle land portion of the middle land portions comprising an auxiliary groove that extends in a linear manner in the tire circumferential direction and has a narrower groove width than the plurality of main grooves, and a plurality of middle land portion narrow grooves being disposed in a row in the tire circumferential direction, the plurality of middle land portion narrow grooves each intersecting the tire circumferential direction, communicating with the main groove located outward in the tire lateral direction and the auxiliary groove at both end portions, and having a narrower groove width than the plurality of lug grooves.

5. The pneumatic tire according to claim 4, wherein the second middle land portion comprises a plurality of middle land portion lug grooves disposed in a row in the tire circumferential direction, the plurality of middle land portion lug grooves each intersecting the tire circumferential direction, communicating with the main groove located inward in the tire lateral direction at a first end, and terminating within the second middle land portion at a second end without reaching the auxiliary groove; and a plurality of communication narrow grooves connecting terminating ends of the plurality of middle land portion lug grooves to the auxiliary groove and having a narrower groove width than the plurality of middle land portion lug grooves.

6. The pneumatic tire according to claim 5, further comprising a plurality of lug narrow grooves in which a lug groove and a narrow groove are present disposed between the plurality of middle land portion lug grooves and the plurality of communication narrow grooves.

7. The pneumatic tire according to claim 4, wherein the shoulder land portions comprise a plurality of shoulder land portion lug grooves disposed in a row in the tire circumferential direction, the plurality of shoulder land portion lug grooves each intersecting the tire circumferential direction and terminating without reaching the main groove located inward of the shoulder land portion in the tire lateral direction; and a shoulder land portion narrow groove disposed between pairs of the plurality of shoulder land portion lug grooves adjacent in the tire circumferential direction, the shoulder land portion narrow groove intersecting the tire circumferential direction, communicating with the main groove located inward of the shoulder land portion in the tire lateral direction at an end portion, and having a narrower groove width than the plurality of shoulder land portion lug grooves.

8. The pneumatic tire according to claim 7, wherein in a first shoulder land portion of the shoulder land portions, a plurality of the shoulder land portion narrow grooves are disposed in a row in the tire circumferential direction between pairs of the shoulder land portion lug grooves adjacent in the tire circumferential direction.

9. The pneumatic tire according to claim 8, wherein the shoulder land portions comprise a plurality of recessed portions formed at an outer end in the tire lateral direction; and the plurality of shoulder land portion narrow grooves terminate at the plurality of recessed portions at an outer end portion in the tire lateral direction.

10. The pneumatic tire according to claim 8, further comprising a plurality of communication narrow grooves connecting terminating ends of the plurality of shoulder land portion lug grooves and the main groove located inward of the shoulder land portion in the tire lateral direction and having a narrower groove width than the plurality of shoulder land portion lug grooves.

11. The pneumatic tire according to claim 10, further comprising a plurality of lug narrow grooves in which a lug groove and a narrow groove are present disposed between the plurality of shoulder land portion lug grooves and the plurality of communication narrow grooves.

12. The pneumatic tire according to claim 10, wherein the main groove located inward of a second shoulder land portion of the shoulder land portions in the tire lateral direction comprises a plurality of bulge grooves at positions corresponding to the plurality of communication narrow grooves that bulge toward an adjacent second middle land portion.

* * * * *